(12) United States Patent
Togashi

(10) Patent No.: US 7,995,325 B2
(45) Date of Patent: Aug. 9, 2011

(54) MULTILAYER CAPACITOR

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 465 days.

(21) Appl. No.: 12/190,014

(22) Filed: Aug. 12, 2008

(65) Prior Publication Data

US 2009/0052113 A1   Feb. 26, 2009

(30) Foreign Application Priority Data

Aug. 23, 2007  (JP) ............................. P2007-217544

(51) Int. Cl.
*H01G 4/005* (2006.01)
*H01G 4/228* (2006.01)
*H01G 4/06* (2006.01)

(52) U.S. Cl. .................... 361/303; 361/306.3; 361/321.2

(58) Field of Classification Search ............... 361/321.2, 361/306.3, 303, 302, 306.2, 306.1, 309
See application file for complete search history.

(56) References Cited

U.S. PATENT DOCUMENTS

| | | | | |
|---|---|---|---|---|
| 5,822,174 A | * | 10/1998 | Yamate et al. | 361/302 |
| 6,052,272 A | * | 4/2000 | Kuroda et al. | 361/303 |
| 6,760,215 B2 | * | 7/2004 | Devoe | 361/303 |
| 6,850,404 B2 | * | 2/2005 | Engel et al. | 361/301.4 |
| 7,027,288 B2 | * | 4/2006 | Shimizu et al. | 361/303 |
| 7,196,897 B2 | * | 3/2007 | Togashi et al. | 361/306.3 |

FOREIGN PATENT DOCUMENTS

| | | |
|---|---|---|
| JP | A-8-37126 | 2/1996 |
| JP | A-8-162368 | 6/1996 |
| JP | A 9-148174 | 6/1997 |
| JP | A-2000-252164 | 9/2000 |

\* cited by examiner

*Primary Examiner* — Eric Thomas
*Assistant Examiner* — David M Sinclair
(74) *Attorney, Agent, or Firm* — Oliff & Berridge, PLC

(57) ABSTRACT

A multilayer capacitor includes a capacitor body having rectangular first and second main faces opposing each other, first and second end faces extending in a shorter side direction of the first and second main faces so as to connect the first and second main faces to each other, and first and second side faces extending in a longer side direction of the first and second main faces so as to connect the first and second main faces to each other. First and second terminal electrodes are arranged on the first and second side faces of the capacitor body, respectively. A first inner electrode connected to the first terminal electrode, a second inner electrode connected to the second terminal electrode, and first and second intermediate electrodes connected to none of the first and second terminal electrodes are arranged within the capacitor body. The first intermediate electrode and first inner electrode form a combined capacitance different from that formed by the second intermediate electrode and second inner electrode.

6 Claims, 11 Drawing Sheets

MULTILAYER CAPACITOR

BACKGROUND OF THE INVENTION

1. Field of the Invention

The present invention relates to a multilayer capacitor.

2. Related Background Art

Known as this kind of multilayer capacitor is one comprising a rectangular parallelepiped capacitor body having a pair of opposing rectangular main faces, a pair of opposing side faces extending in a longer side direction of the pair of main faces so as to connect the pair of main faces to each other, and a pair of opposing end faces extending in a shorter side direction of the pair of main faces so as to connect the pair of main faces to each other; and a plurality of terminal electrodes arranged on the pair of side faces; wherein the capacitor body includes a plurality of insulator layers laminated in the opposing direction of the pair of main faces, and a plurality of inner electrodes arranged so as to oppose each other while holding therebetween at least one insulator layer in the plurality of insulator layers and connected to their corresponding terminal electrodes (see, for example, Japanese Patent Application Laid-Open No. 9-148174). Since the distance between the terminal electrodes arranged on a pair of side faces is short in the multilayer capacitor disclosed in Japanese Patent Application Laid-Open No. 9-148174, the current path becomes relatively short in the multilayer capacitor, whereby its equivalent series inductance (ESL) can be made smaller.

SUMMARY OF THE INVENTION

However, the multilayer capacitor disclosed in Japanese Patent Application Laid-Open No. 9-148174 has only one capacitor component and thus is hard to attain low impedance over a wide frequency band.

It is an object of the present invention to provide a multilayer capacitor which can attain low impedance over a wide frequency band.

In one aspect, the present invention provides a multilayer capacitor comprising: a capacitor body having rectangular first and second main faces opposing each other, first and second end faces extending in a shorter side direction of the first and second main faces so as to connect the first and second main faces to each other, and first and second side faces extending in a longer side direction of the first and second main faces so as to connect the first and second main faces to each other, the capacitor body exhibiting a dielectric characteristic; a first terminal electrode arranged on the first side face of the capacitor body; a second terminal electrode arranged on the second side face of the capacitor body; a first inner electrode connected to the first terminal electrode and arranged within the capacitor body; and a second inner electrode connected to the second terminal electrode and arranged within the capacitor body; wherein the first inner electrode includes first and second main electrode portions arranged in a row along the opposing direction of the first and second end faces, and a first lead electrode portion extending from the first and second main electrode portions to the first side face and having an end exposed at the first side face and connected to the first terminal electrode; wherein the second inner electrode includes third and fourth main electrode portions arranged in a row along the opposing direction of the first and second end faces, and a second lead electrode portion extending from the third and fourth main electrode portions to the second side face and having an end exposed at the second side face and connected to the second terminal electrode; wherein first and second intermediate electrodes connected to none of the first and second terminal electrodes are arranged at least one each within the multilayer capacitor; wherein the at least one first intermediate electrode is arranged so as to form a plurality of capacitance components connected in series in cooperation with the first and third main electrode portions; wherein the at least one second intermediate electrode is arranged so as to form a plurality of capacitance components connected in series in cooperation with the second and fourth main electrode portions; wherein the plurality of capacitance components formed by the at least one first intermediate electrode and first and third main electrode portions yield a combined capacitance different from that of the plurality of capacitance components formed by the at least one second intermediate electrode and second and fourth main electrode portions; wherein an end of the first main electrode portion on the first end face side and an end of the first lead electrode portion on the first end face side coincide with each other at a boundary between the first main electrode portion and first lead electrode portion; wherein an end of the second main electrode portion on the second end face side and an end of the first lead electrode portion on the second end face side coincide with each other at a boundary between the second main electrode portion and first lead electrode portion; wherein an end of the third main electrode portion on the first end face side and an end of the second lead electrode portion on the first end face side coincide with each other at a boundary between the third main electrode portion and second lead electrode portion; and wherein an end of the fourth main electrode portion on the second end face side and an end of the second lead electrode portion on the second end face side coincide with each other at a boundary between the fourth main electrode portion and second lead electrode portion.

In this multilayer capacitor, the first and second terminal electrodes are formed on longitudinally extending side faces of the capacitor body having a rectangular parallelepiped form. This can shorten current paths through the first and second inner electrodes, thereby lowering the equivalent series inductance of the multilayer capacitor. In the first inner electrode, the first and second main electrode portions contributing to forming the capacitance are arranged as wide as the first lead electrode portion in the opposing direction of the first and second end faces. This can further shorten the current path through the first inner electrode. In the second inner electrode, the third and fourth main electrode portions contributing to forming the capacitance are arranged as wide as the second lead electrode portion in the opposing direction of the first and second end faces. This can further shorten the current path through the second inner electrode. They can also lower the equivalent series inductance of the multilayer capacitor. In this multilayer capacitor, the combined capacitance of a plurality of capacitance components connected in series and formed by the first and second inner electrodes and first intermediate electrode differs from that of a plurality of capacitance components connected in series and formed by the first and second inner electrodes and second intermediate electrode. Since these different combined capacitances are connected in parallel with each other, the multilayer capacitor can lower the impedance over a wide frequency band.

In this case, the first and second intermediate electrodes may be provided one by one, wherein the first intermediate electrode includes a first region opposing the first main electrode portion along the opposing direction of the first and second main faces on the first side face side and a second region opposing the third main electrode portion along the opposing direction of the first and second main faces on the second side face side, wherein the second intermediate electrode includes a third region opposing the second main electrode portion along the opposing direction of the first and second main faces on the first side face side and a fourth region opposing the fourth main electrode portion along the opposing direction of the first and second main faces on the second side face side, and wherein the first and second regions has a total area whose size is different from that of the third and fourth regions. This can make the combined capacitance of a plurality of capacitance components formed by the first and second inner electrodes and first intermediate electrode different from that of a plurality of capacitance components formed by the first and second inner electrodes and second intermediate electrode.

The second intermediate electrode may be provided by a plural number different from that of the first intermediate electrode, wherein the second intermediate electrode positioned closest to the first side face in the plurality of second intermediate electrodes has a region opposing the second main electrode portion, wherein the second intermediate electrode positioned closest to the second side face in the plurality of second intermediate electrodes has a region opposing the fourth main electrode portion, and wherein each of the second intermediate electrodes has a region opposing another of the second intermediate electrodes. Since the number of first intermediate electrodes and the number of second intermediate electrodes differ from each other, the combined capacitance of a plurality of capacitance components formed by the first and second inner electrodes and first intermediate electrode can be made different from that of a plurality of capacitance components formed by the first and second inner electrodes and second intermediate electrode.

In another aspect, the present invention provides a multilayer capacitor comprising a capacitor body having rectangular first and second main faces opposing each other, first and second end faces extending in a shorter side direction of the first and second main faces so as to connect the first and second main faces to each other, and first and second side faces extending in a longer side direction of the first and second main faces so as to connect the first and second main faces to each other, the capacitor body exhibiting a dielectric characteristic; a first terminal electrode arranged on the first side face of the capacitor body; a second terminal electrode arranged on the second side face of the capacitor body; a first inner electrode connected to the first terminal electrode and arranged within the capacitor body; and second and third inner electrodes connected to the second terminal electrode and arranged within the capacitor body; wherein the first inner electrode includes first and second main electrode portions arranged in a row along the opposing direction of the first and second end faces, and a first lead electrode portion extending from the first and second main electrode portions to the first side face and having an end exposed at the first side face and connected to the first terminal electrode; wherein the second inner electrode includes a third main electrode portion, and a second lead electrode portion extending from the third main electrode portion to the second side face and having an end exposed at the second side face and connected to the second terminal electrode; wherein the third inner electrode includes a fourth main electrode portion opposing the first main electrode portion along the opposing direction of the first and second main faces so as to form one capacitance component, and a third lead electrode portion extending from the fourth main electrode portion to the second side face and having an end exposed at the second side face and connected to the second terminal electrode; wherein at least one intermediate electrode connected to none of the first and second terminal electrodes is arranged within the capacitor body; wherein the at least one intermediate electrode is arranged so as to form a plurality of capacitance components connected in series in cooperation with the second and third main electrode portions; wherein the at least one intermediate electrode is arranged so as to form a plurality of capacitance components connected in series in cooperation the second and fourth main electrode portions; wherein the one capacitance formed by the first and fourth main electrode portions differs from a combined capacitance of the plurality of capacitance components formed by the at least one intermediate electrode and second and third main electrode portions; wherein an end of the first main electrode portion on the first end face side and an end of the first lead electrode portion on the first end face side coincide with each other at a boundary between the first main electrode portion and first lead electrode portion; and wherein an end of the second main electrode portion on the second end face side and an end of the first lead electrode portion on the second end face side coincide with each other at a boundary between the second main electrode portion and first lead electrode portion.

In this multilayer capacitor, the first and second terminal electrodes are formed on longitudinally extending side faces of the capacitor body having a rectangular parallelepiped form. This can shorten current paths through the first and second inner electrodes, thereby lowering the equivalent series inductance of the multilayer capacitor. In the first inner electrode, the first and second main electrode portions contributing to forming the capacitance are arranged as wide as the first lead electrode portion in the opposing direction of the first and second end faces. This can further shorten the current path through the first inner electrode. This can also lower the equivalent series inductance of the multilayer capacitor. In this multilayer capacitor, the capacitance formed by the first and third inner electrodes differs from the combined capacitance of a plurality of capacitance components connected in series and formed by the first and second inner electrodes and intermediate electrode. Since these different capacitances are connected in parallel with each other, the multilayer capacitor can lower the impedance over a wide frequency band.

Preferably, in the opposing direction of the first and second end faces, each of the second and third lead electrode portions has a length identical to that of the first lead electrode portion. This can further lower the equivalent series inductance.

The intermediate electrode may be provided by a plural number, wherein the intermediate electrode positioned closest to the first side face in the plurality of intermediate electrodes has a region opposing the second main electrode portion, wherein the intermediate electrode positioned closest to the second side face in the plurality of intermediate electrodes has a region opposing the fourth main electrode portion, and wherein each of the intermediate electrodes has a region opposing another of the intermediate electrodes. This allows the intermediate electrodes and the second and fourth main electrode portions to form a plurality of capacitance components connected in series.

The present invention can provide a multilayer capacitor which can attain low impedance over a wide frequency band.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments will be explained in detail with reference to the accompanying drawings. In the explanation, the same constituents or those having the same functions will be referred to with the same numerals or letters while omitting their overlapping descriptions.

First Embodiment

Figure 1:
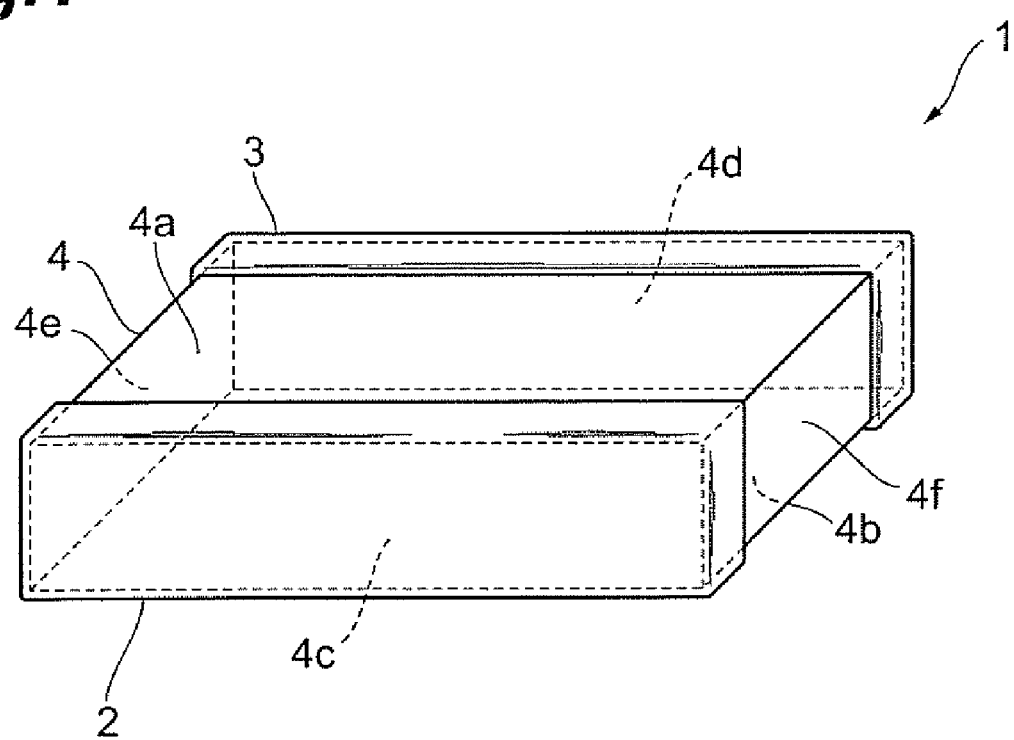
FIG. 1 is a perspective view of the multilayer capacitor in accordance with a first embodiment.
Figure 2:
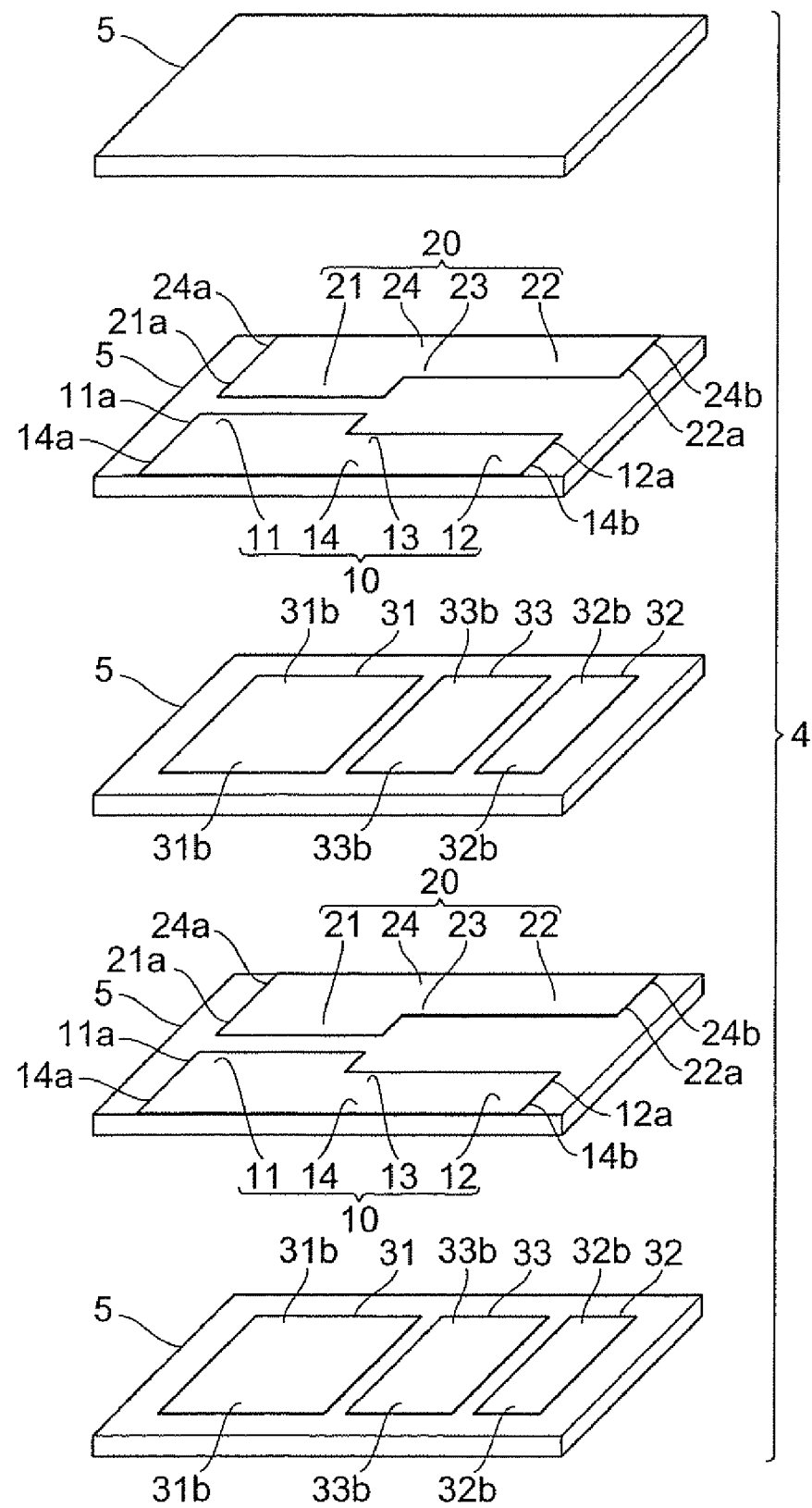
FIG. 2 is an exploded perspective view of the capacitor body included in the multilayer capacitor in accordance with the first embodiment.
Figure 3:
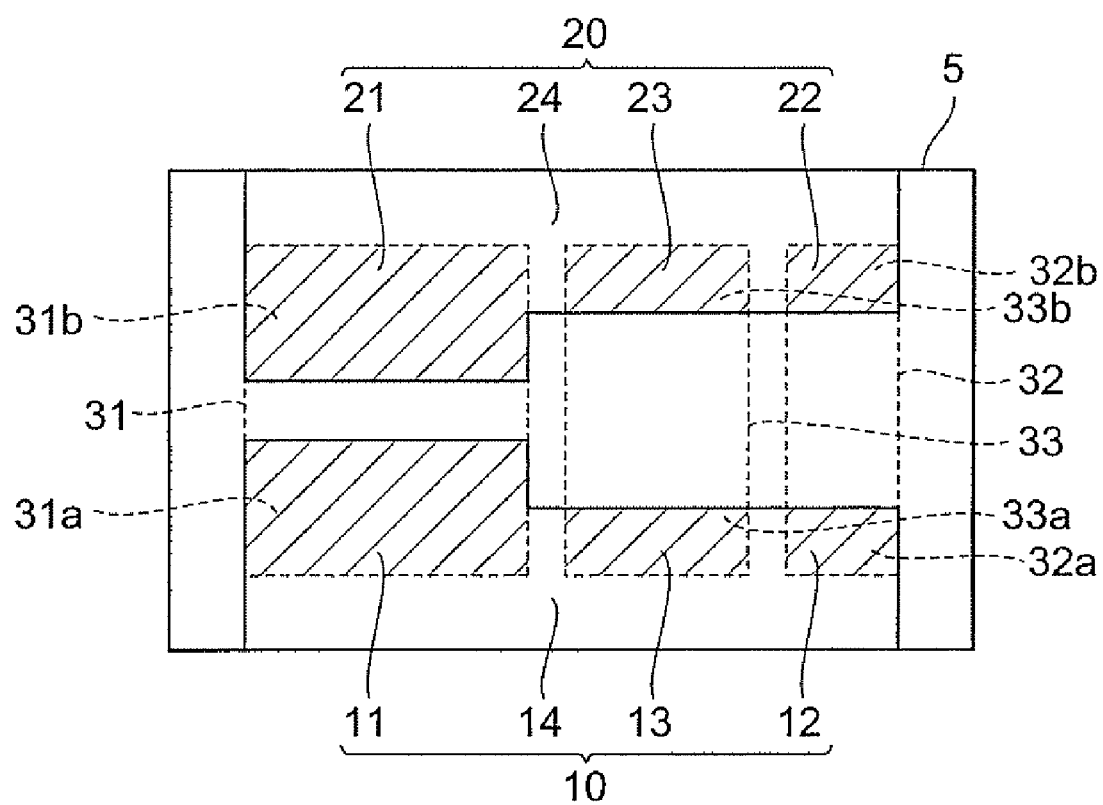
FIG. 3 is a view for explaining the opposing relationship between the inner and intermediate electrodes included in the capacitor body.
Figure 4:
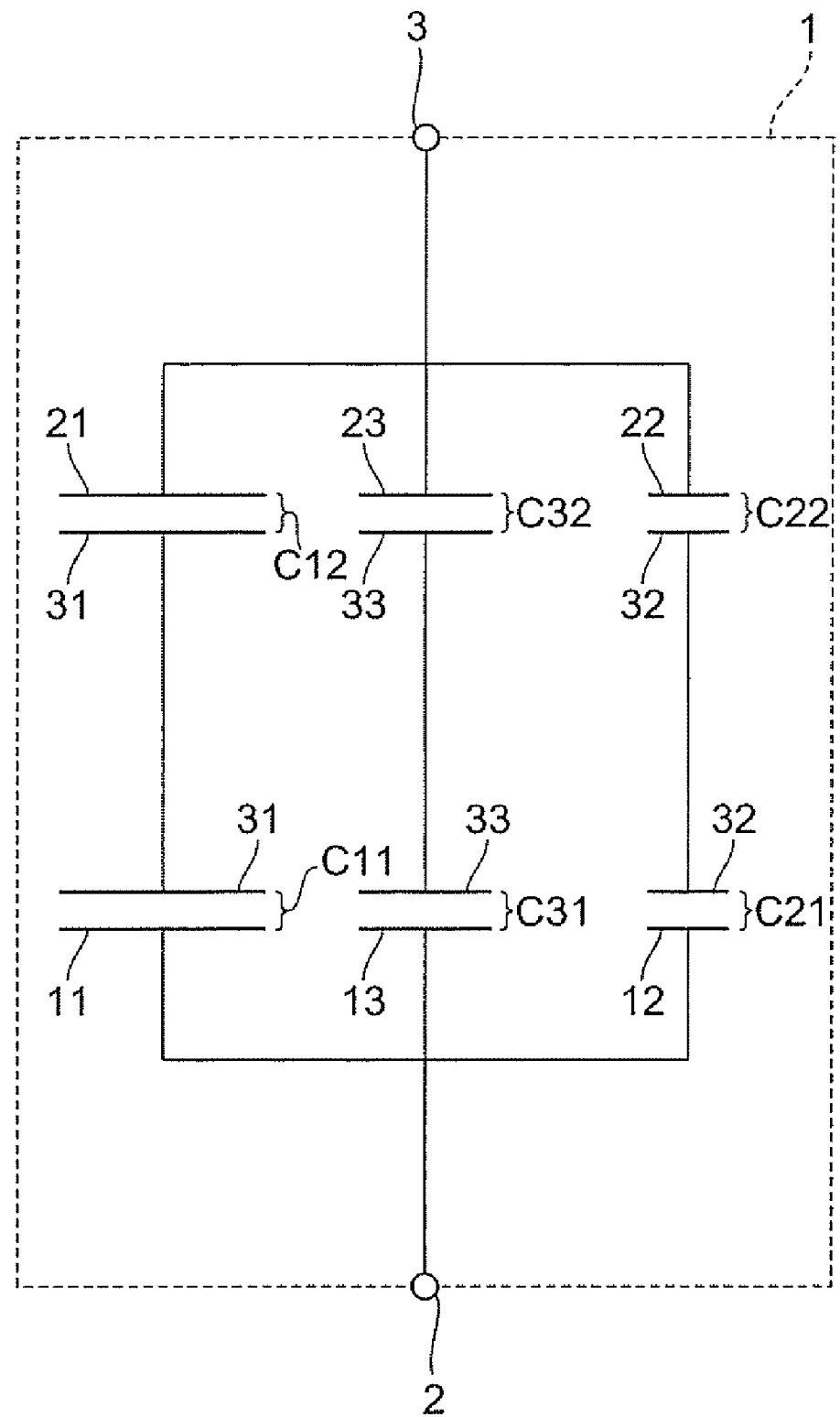
FIG. 4 is an equivalent circuit diagram of the multilayer capacitor in accordance with the first embodiment.

The structure of the multilayer capacitor 1 in accordance with the first embodiment will be explained with reference to FIGS. 1 to 4. FIG. 1 is a perspective view of the multilayer capacitor in accordance with this embodiment. FIG. 2 is an exploded perspective view of the capacitor body included in the multilayer capacitor in accordance with this embodiment. FIG. 3 is a view for explaining the opposing relationship between the inner and intermediate electrodes included in the capacitor body of the multilayer capacitor in accordance with this embodiment. FIG. 4 is an equivalent circuit diagram of the multilayer capacitor in accordance with this embodiment.

As shown in FIG. 1, the multilayer capacitor 1 comprises a capacitor body 4 having a rectangular parallelepiped form, and a first terminal electrode 2 and a second terminal electrode 3 which are arranged on outer surfaces of the capacitor body 4. As shown in FIG. 1, the capacitor body 4 has rectangular first and second main faces 4a, 4b opposing each other, first and second side faces 4c, 4d extending in the longer side direction of the first and second main faces 4a, 4b so as to connect the first and second main faces 4a, 4b to each other, and first and second end faces 4e, 4f extending in the shorter side direction of the first and second main faces 4a, 4b so as to connect the first and second main faces 4a, 4b to each other.

The first terminal electrode 2 is arranged on the first side face 4c of the capacitor body 4. The second terminal electrode 3 is arranged on the second side face 4d of the capacitor body 4. The first and second terminal electrodes 2, 3 are formed, for example, by applying and burning a conductive paste containing a conductive metal powder and glass frit onto their corresponding outer surfaces of the capacitor body 4. A plating layer may be formed on the burned electrode when necessary.

As shown in FIG. 2, the capacitor body has a plurality of (5 in this embodiment) laminated dielectric layers 5. Each dielectric layer 5 is constituted by a sintered body of a ceramic green sheet containing a dielectric ceramic, for example. Therefore, the capacitor body 4 exhibits a dielectric characteristic. In the multilayer capacitor 1 in practice, the dielectric layers 5 are integrated to such an extent that their boundaries are indiscernible.

As shown in FIG. 2, a plurality of (2 in this embodiment) first inner electrodes 10, a plurality of (2 in this embodiment) second inner electrodes 20, a plurality of (2 in this embodiment) first intermediate electrodes 31, a plurality of (2 in this embodiment) second intermediate electrodes 32, and a plurality of (2 in this embodiment) third intermediate electrodes 33 are arranged within the capacitor body 4. Each of the inner electrodes 10, 20 and intermediate electrodes 31 to 33 is constituted by a sintered body of a conductive paste, for example.

In the capacitor body 4, a pair of first and second inner electrodes 10, 20 are arranged on the same layer in the opposing direction of the first and second main faces 4a, 4b. In the capacitor body 4, a set of first to third intermediate electrodes 31 to 33 are arranged on the same layer in the opposing direction of the first and second main faces 4a, 4b. The layers arranged with the respective pairs of first and second inner electrodes 10, 20 alternate with the layers arranged with the respective sets of first to third intermediate electrodes 31 to 33 in the opposing direction of the first and second main faces 4a, 4b. Namely, each pair of first and second inner electrodes 10, 20 are arranged with one each of the first to third intermediate electrodes 31 to 33.

Each first inner electrode 10 includes a first main electrode portion 11, a fifth main electrode portion 13, and a second main electrode portion 12 which are continuously arranged in a row along the opposing direction of the first and second end faces 4e, 4f, and a first lead electrode portion 14 extending from the first, second, and fifth main electrode portions 11, 12, 13 to the first side face 4c. The first main electrode portion 11, fifth main electrode portion 13, and second main electrode portion 12 are positioned in this order from the first end face 4e side to the second end face 4f side. The first main electrode portion 11 has an area greater than any of the second and fifth main electrode portions 12, 13 and is formed such as to project more toward the second side face 4d than the second and fifth main electrode portions 12, 13 do.

The second and fifth main electrode portions 12, 13 have the same length in the opposing direction of the first and second side faces 4c, 4d. The end of the second main electrode portion 12 on the second side face 4d side and the end of the fifth main electrode portion 13 on the second side face 4d side are positioned on the same line. In the opposing direction of the first and second end faces 4e, 4f, on the other hand, the length of the second main electrode portion 12 is shorter than the fifth main electrode portion 13.

The first lead electrode portion 14 has an end exposed at the first side face 4c and connected to the first terminal electrode 2. The end 11a of the first main electrode portion 11 on the first end face 4e side and the end 14a of the first lead electrode portion 14 on the first end face 4e side form the same line. Namely, the end 11a of the first main electrode portion 11 on the first end face 4e side and the end 14a of the first lead electrode portion 14 on the first end face 4e side coincide with each other at the boundary between the first main electrode portion 11 and first lead electrode portion 14.

The end 12a of the second main electrode portion 12 on the second end face 4f side and the end 14b of the first lead electrode portion 14 on the second end face 4f side form the same line. Namely, the end 12a of the second main electrode portion 12 on the second end face 4f side and the end 14b of the first lead electrode portion 14 on the second end face 4f side coincide with each other at the boundary between the second main electrode portion 12 and first lead electrode portion 14.

Each second inner electrode 20 includes a third main electrode portion 21, a sixth main electrode portion 23, and a fourth main electrode portion 22 which are continuously arranged in a row along the opposing direction of the first and second end faces 4e, 4f, and a second lead electrode portion 24 extending from the third, fourth, and sixth main electrode portions 21, 22, 23 to the second side face 4d. The third main electrode portion 21, sixth main electrode portion 23, and fourth main electrode portion 22 are positioned in this order from the first end face 4e side to the second end face 4f side. The third main electrode portion 21 has an area greater than any of the fourth and sixth main electrode portions 22, 23 and is formed such as to project more toward the first side face 4c than the fourth and sixth main electrode portions 22, 23 do.

The fourth and sixth main electrode portions 22, 23 have the same length in the opposing direction of the first and second side faces 4c, 4d. The end of the fourth main electrode portion 22 on the first side face 4c side and the end of the sixth main electrode portion 23 on the first side face 4c side are positioned on the same line. In the opposing direction of the first and second end faces 4e, 4f, on the other hand, the fourth main electrode portion 22 is shorter than the sixth main electrode portion 23.

The second lead electrode portion 24 has an end exposed at the second side face 4d and connected to the second terminal electrode 3. The end 21a of the third main electrode portion 21 on the first end face 4e side and the end 24a of the second lead electrode portion 24 on the first end face 4e side form the same line. Namely, the end 21a of the third main electrode portion 21 on the first end face 4e side and the end 24a of the second lead electrode portion 24 on the first end face 4e side coincide with each other at the boundary between the third main electrode portion 21 and first lead electrode portion 24.

The end 22a of the fourth main electrode portion 22 on the second end face 4f side and the end 24b of the second lead electrode portion 24 on the second end face 4f side form the same line. Namely, the end 22a of the fourth main electrode portion 22 on the second end face 4f side and the end 24b of the second lead electrode portion 24 on the second end face 4f side coincide with each other at the boundary between the fourth main electrode portion 22 and second lead electrode portion 24.

Each set of first to third intermediate electrodes 31 to 33 are continuously arranged in a row on the same dielectric layer 5 in the order of the first intermediate electrode 31, third intermediate electrode 33, and second intermediate electrode 32 from the first end face 4e side to the second end face 4f side. The first to third intermediate electrodes 31 to 33 have rectangular forms. The first to third intermediate electrodes 31 to 33 have areas different from each other, so that their areas decrease in the order of the first, third, and second intermediate electrodes 31, 33, and 32 in this embodiment.

The first intermediate electrode 31 is arranged such as to bridge the first main electrode portion 11 of the first inner electrode 10 and the third main electrode portion 21 of the second inner electrode 20 when seen in the opposing direction of the first and second main faces 4a, 4b. The second intermediate electrode 32 is arranged such as to bridge the second main electrode portion 12 of the first inner electrode 10 and the fourth main electrode portion 22 of the second inner electrode 20 when seen in the opposing direction of the first and second main faces 4a, 4b. The third intermediate electrode 33 is arranged such as to bridge the fifth main electrode portion 13 of the first inner electrode 10 and the sixth main electrode portion 23 of the second inner electrode 20 when seen in the opposing direction of the first and second main faces 4a, 4b.

FIG. 3 is a view explaining the opposing relationship between the first and second inner electrodes 10, 20 and the first to third intermediate electrodes 31 to 33 in the opposing direction of the first and second main faces 4a, 4b. The areas where the inner and intermediate electrodes oppose each other are hatched in FIG. 3 for easier viewing. Further, the first to third intermediate electrodes 31 to 33 are illustrated by broken lines in FIG. 3 for easier viewing.

On the first side face 4c side, as shown in FIG. 3, the first intermediate electrode 31 has a first region 31a opposing the first main electrode portion 11 of the first inner electrode 10 along the opposing direction of the first and second main faces 4a, 4b. On the second side face 4d side, the first intermediate electrode 31 has a second region 31b opposing the third main electrode portion 21 of the second inner electrode 20 along the opposing direction of the first and second main faces 4a, 4b.

On the first side face 4c side, as shown in FIG. 3, the second intermediate electrode 32 has a third region 32a opposing the second main electrode portion 12 of the first inner electrode 10 along the opposing direction of the first and second main faces 4a, 4b. On the second side face 4d side, the second intermediate electrode 32 has a fourth region 32b opposing the fourth main electrode portion 22 of the second inner electrode 20 along the opposing direction of the first and second main faces 4a, 4b.

On the first side face 4c side, as shown in FIG. 3, the third intermediate electrode 33 has a fifth region 33a opposing the fifth main electrode portion 13 of the first inner electrode 10 along the opposing direction of the first and second main faces 4a, 4b. On the second side face 4d side, the third intermediate electrode 33 has a sixth region 33b opposing the sixth main electrode portion 23 of the second inner electrode 20 along the opposing direction of the first and second main faces 4a, 4b.

Letting S1 be the total area of the first and second regions 31a and 31b, S2 be the total area of the third and fourth regions 32a and 32b, and S3 be the total area of the fifth and sixth areas 33a and 33b, the following inequality holds:

$$S1 > S3 > S2. \qquad (1)$$

Namely, the total area S1 of the first and second regions 31a, 31b, the total area S1 of the third and fourth regions 32a, 32b, and the total area S3 of the fifth and sixth regions 33a, 33b differ from each other.

FIG. 4 shows an equivalent circuit diagram of the multilayer capacitor 1. As shown in FIG. 4, the first main electrode portion 11 of the first inner electrode 10 and the first region 31a of the first intermediate electrode 31 form a capacitance component C11. The second region 31b of the first intermediate electrode 31 and the third main electrode portion 21 of the second inner electrode 20 form a capacitance component C12. Thus, the first intermediate electrode 31 forms a plurality of serially connected capacitance components C11, C12 with the first main electrode portion 11 of the first inner electrode 10 and the third main electrode portion 21 of the second inner electrode 20.

As shown in FIG. 4, the second main electrode portion 12 of the first inner electrode 10 and the third region 32a of the second intermediate electrode 32 form a capacitance component C21. The fourth region 32b of the second intermediate electrode 32 and the fourth main electrode portion 22 of the second inner electrode 20 form a capacitance component C22. Thus, the second intermediate electrode 32 forms a plurality of serially connected capacitance components C21, C22 with the second main electrode portion 12 of the first inner electrode 10 and the fourth main electrode portion 22 of the second inner electrode 20.

As shown in FIG. 4, the fifth main electrode portion 13 of the first inner electrode 10 and the fifth region 33a of the third intermediate electrode 33 form a capacitance component C31. The sixth region 33b of the third intermediate electrode 33 and the sixth main electrode portion 23 of the second inner electrode 20 form a capacitance component C32. Thus, the third intermediate electrode 33 forms a plurality of serially connected capacitance components C31, C32 with the fifth main electrode portion 13 of the first inner electrode 10 and the sixth main electrode portion 23 of the second inner electrode 20.

As can be understood from FIG. 4, the sets of capacitance components C11, C12 formed by the first and second inner electrodes 10, 20 and first intermediate electrode 31, capacitance components C21, C22 formed by the first and second inner electrodes 10, 20 and second intermediate electrode 32, and capacitance components C31, C32 formed by the first and second inner electrodes 10, 20 and third intermediate electrode 33 are connected in parallel.

The above-mentioned inequality (1) indicates that the combined capacitance of the two capacitance components C11, C12 formed by the first intermediate electrode 31 and first and third main electrode portions 11, 21 is greater than the combined capacitance of the two capacitance components C21, C22 formed by the second intermediate electrode 32 and second and fourth main electrode portions 12, 22. The above-mentioned inequality (1) also indicates that the combined capacitance of the two capacitance components C21, C22 formed by the second intermediate electrode 32 and second and fourth main electrode portions 12, 22 is smaller than the combined capacitance of the two capacitance components C31, C32 formed by the third intermediate electrode 33 and fifth and sixth main electrode portions 13, 23.

Namely, the combined capacitance of the two capacitance components C11, C12 formed by the first intermediate electrode 31 and first and third main electrode portions 11, 21, the combined capacitance of the two capacitance components C21, C22 formed by the second intermediate electrode 32 and second and fourth main electrode portions 12, 22, and the combined capacitance of the two capacitance components C31, C32 formed by the third intermediate electrode 33 and fifth and sixth main electrode portions 13, 23 are connected in parallel, while exhibiting respective values different from each other.

In the multilayer capacitor 1, the first and second terminal electrodes 2, 3 are formed on the first and second side faces 4c, 4d extending in the longitudinal direction of the capacitor body 4 having a rectangular parallelepiped form. This can shorten current paths through the first and second inner electrodes 10, 20, thereby lowering the equivalent series inductance of the multilayer capacitor 1.

In the first inner electrode 10, the first, second, and fifth main electrode portions 11 to 13 contributing to forming the capacitance are arranged as wide as the first lead electrode portion 14 in the opposing direction of the first and second end faces 4e, 4f. This can further shorten the current path through the first inner electrode 10.

In the second inner electrode 20, the third, fourth, and sixth main electrode portions 21 to 23 contributing to forming the capacitance are arranged as wide as the second lead electrode portion 24 in the opposing direction of the first and second end faces 4e, 4f. This can further shorten the current path through the second inner electrode 20.

By contriving the relationship between the portions contributing to forming the capacitance and the lead electrode portions in the first and second inner electrodes 10, 20 as mentioned above, the multilayer capacitor 1 shortens the paths of currents flowing through the inner electrodes, whereby the equivalent series inductance can further be lowered.

In the multilayer capacitor 1, combined capacitances differ among the plurality of serially connected capacitance components C11, C12 formed by the first and second inner electrodes 10, 20 and first intermediate electrode 31, the plurality of serially connected capacitance components C21, C22 formed by the first and second inner electrodes 10, 20 and second intermediate electrode 32, and the plurality of serially connected capacitance components C31, C32 formed by the first and second inner electrodes 10, 20 and third intermediate electrode 33. As shown in FIG. 4, these different combined capacitances are connected in parallel, whereby the multilayer capacitor 1 can lower impedance over a wide frequency band.

The multilayer capacitor 1 has the first to third intermediate electrodes 31 to 33, with which the first and second inner electrodes 10, 20 form capacitances. Therefore, varying the areas of the intermediate electrodes 31 to 33 can diversify the combined capacitances connected in parallel within the multilayer capacitor 1. For example, increasing the difference between the area of the first intermediate electrode 31 and that of the second intermediate electrode 32 can enhance the difference among the combined capacitances connected in parallel, whereby the impedance can be lowered over a wider band.

Second Embodiment

Figure 5:
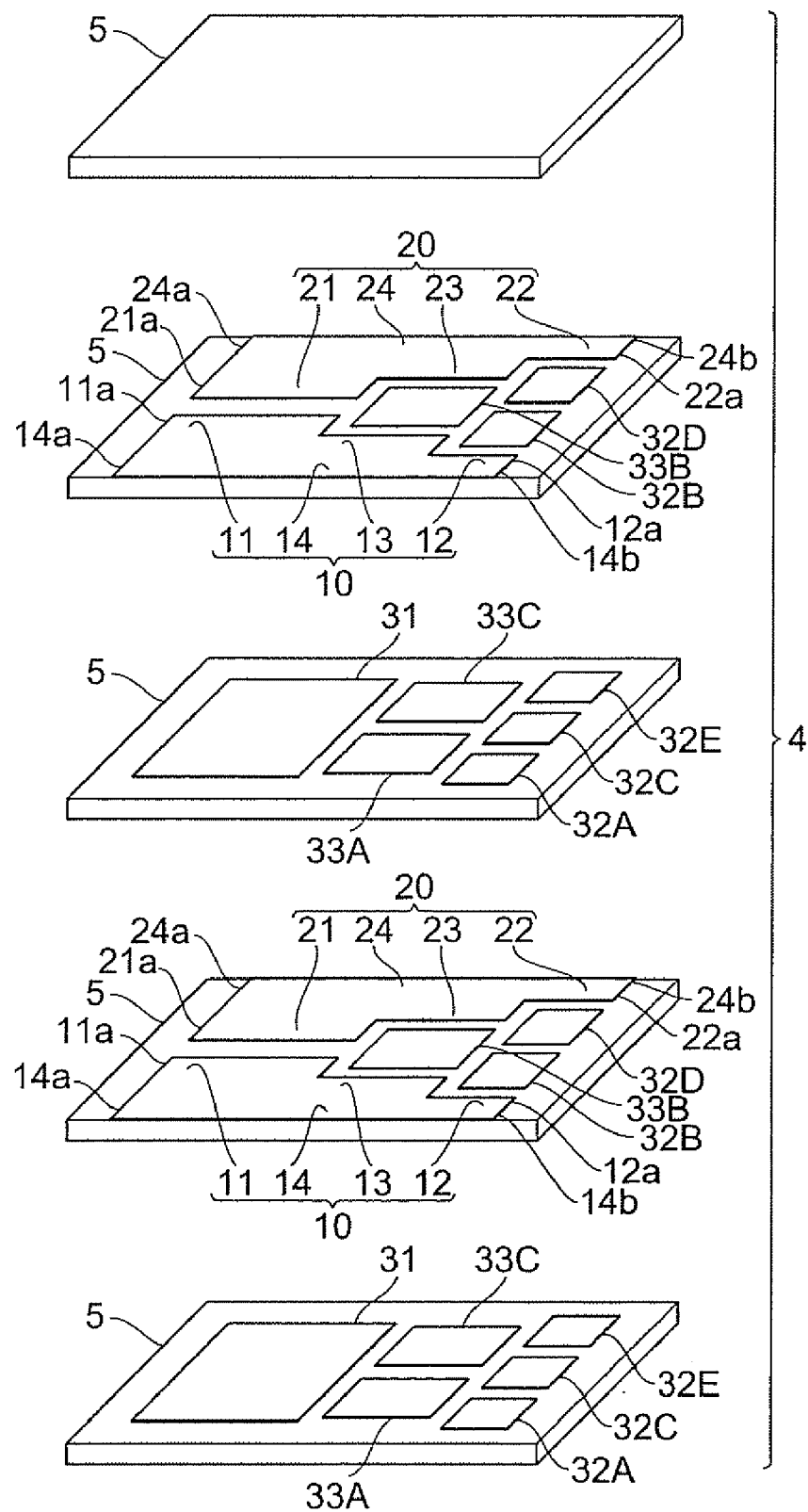
FIG. 5 is a perspective view of the multilayer capacitor in accordance with a second embodiment.
Figure 6:
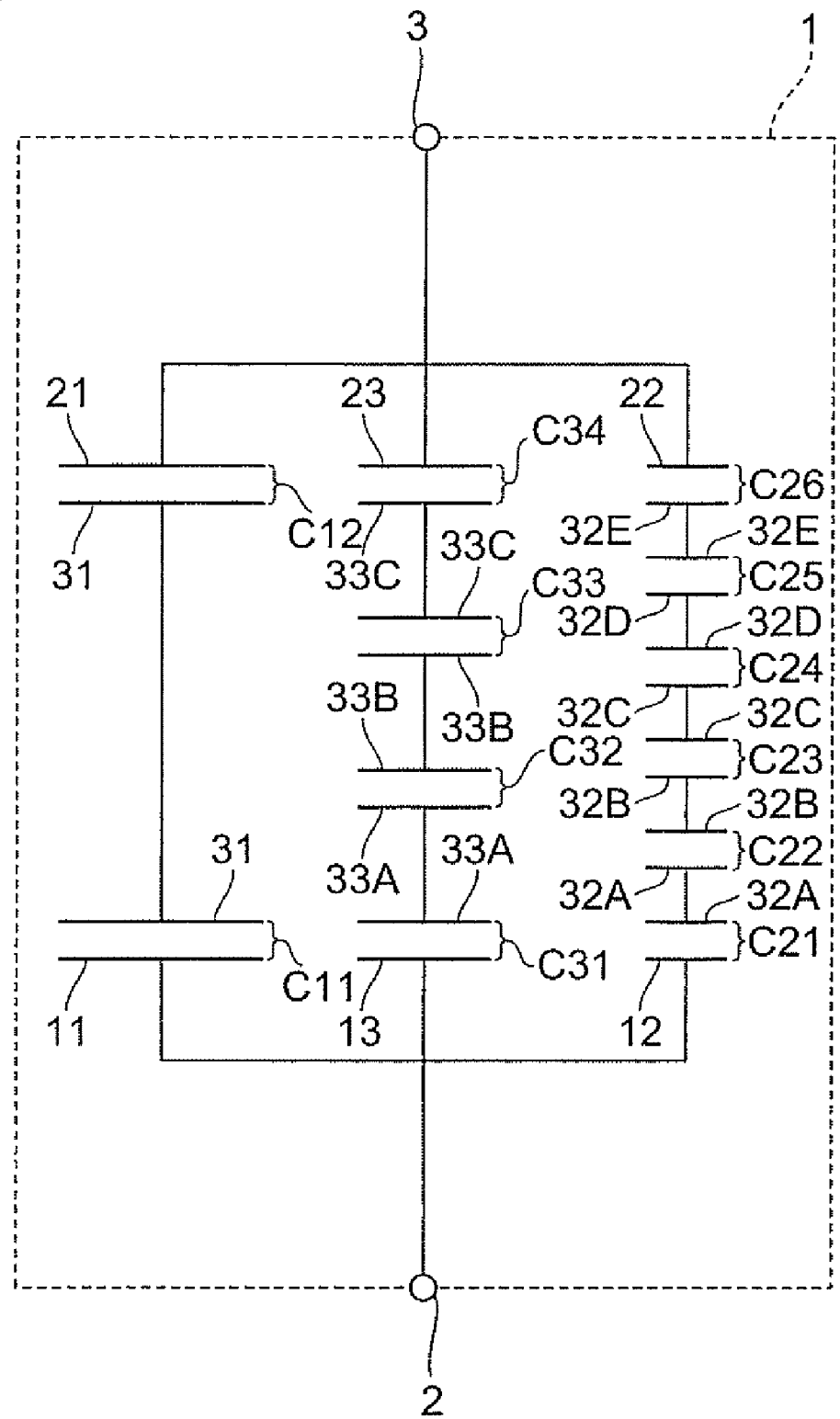
FIG. 6 is an equivalent circuit diagram of the multilayer capacitor in accordance with the second embodiment.

With reference to FIGS. 5 and 6, the structure of the multilayer capacitor in accordance with the second embodiment will be explained. The multilayer capacitor in accordance with the second embodiment differs from the multilayer capacitor in accordance with the first embodiment in terms of the number of intermediate electrodes. FIG. 5 is an exploded perspective view of the capacitor body included in the multilayer capacitor in accordance with the second embodiment. FIG. 6 is an equivalent circuit diagram of the multilayer capacitor in accordance with the second embodiment.

Though not depicted, the multilayer capacitor in accordance with the second embodiment comprises a capacitor body 4, a first terminal electrode 2, and a second terminal electrode 3 as with the multilayer capacitor 1 in accordance with the first embodiment. As shown in FIG. 5, the capacitor body 4 has a plurality of (5 in this embodiment) laminated dielectric layers 5.

As shown in FIG. 5, a plurality of (2 in this embodiment) first inner electrodes 10, a plurality of (2 in this embodiment) second inner electrodes 20, a plurality of (2 in this embodiment) first intermediate electrodes 31, a plurality of (10 in this embodiment) second intermediate electrodes 32A to 32E, and a plurality of (6 in this embodiment) third intermediate electrodes 33A to 33C are arranged in the capacitor body 4.

In the capacitor body 4, a pair of first and second inner electrodes 10, 20, a set of second inner electrodes 32B, 32D, and one third intermediate electrode 33B are arranged on the same layer in the opposing direction of the first and second main faces 4a, 4b. In the capacitor body 4, a set of first to third intermediate electrodes 31, 32A, 32C, 32E, 33A, 33C are arranged on the same layer in the opposing direction of the first and second main faces 4a, 4b. The layers arranged with the respective pairs of first and second inner electrodes 10, 20, sets of second inner electrodes 32B, 32D, and third intermediate electrodes 33B alternate with the layers arranged with the respective sets of first to third intermediate electrodes 31, 32A, 32C, 32E, 33A, 33C in the opposing direction of the first and second main faces 4a, 4b.

Each first inner electrode 10 includes a first main electrode portion 11, a fifth main electrode portion 13, and a second main electrode portion 12 which are continuously arranged in a row along the opposing direction of the first and second end faces 4e, 4f, and a first lead electrode portion 14 extending from the first, second, and fifth main electrode portions 11, 12, 13 to the first side face 4c. The first main electrode portion 11, fifth main electrode portion 13, and second main electrode portion 12 are positioned in this order from the first end face 4e side to the second end face 4f side.

The first main electrode portion 11 has an area greater than any of the second and fifth main electrode portions 12, 13 and is formed such as to project more toward the second side face 4d than the second and fifth main electrode portions 12, 13 do. The fifth main electrode portion 13 has an area smaller than the first main electrode portion 11 but greater than the second main electrode portion 12. The fifth main electrode portion 13 is formed such as to project more toward the second side face 4d than the second main electrode portion 12 does. The second main electrode portion 12 has an area smaller than any of the first and fifth main electrode portions 11, 13. Namely, the first, second, and fifth main electrode portions 11 to 13 are formed stepwise.

The first lead electrode portion 14 has an end exposed at the first side face 4c and connected to the first terminal electrode 2. The end 11a of the first main electrode portion 11 on the first end face 4e side and the end 14a of the first lead electrode portion 14 on the first end face 4e side form the same line. Namely, the end 11a of the first main electrode portion 11 on the first end face 4e side and the end 14a of the first lead electrode portion 14 on the first end face 4e side coincide with each other at the boundary between the first main electrode portion 11 and first lead electrode portion 14.

The end 12a of the second main electrode portion 12 on the second end face 4f side and the end 14b of the first lead electrode portion 14 on the second end face 4f side form the same line. Namely, the end 12a of the second main electrode portion 12 on the second end face 4f side and the end 14b of the first lead electrode portion 14 on the second end face 4f side coincide with each other at the boundary between the second main electrode portion 12 and first lead electrode portion 14.

Each second inner electrode 20 includes a third main electrode portion 21, a sixth main electrode portion 23, and a fourth main electrode portion 22 which are continuously arranged in a row along the opposing direction of the first and second end faces 4e, 4f, and a second lead electrode portion 24 extending from the third, sixth, and fourth main electrode portions 21, 22, 23 to the second side face 4d. The third main electrode portion 21, sixth main electrode portion 23, and fourth main electrode portion 22 are positioned in this order from the first end face 4e side to the second end face 4f side.

The third main electrode portion 21 has an area greater than any of the fourth and sixth main electrode portions 22, 23 and is formed such as to project more toward the first side face 4c than the fourth and sixth main electrode portions 22, 23 do. The sixth main electrode portion 23 has an area smaller than the third main electrode portion 21 but greater than the fourth main electrode portion 22. The sixth main electrode portion 23 is formed such as to project more toward the first side face 4c than the fourth main electrode portion 22 does. The fourth main electrode portion 22 has an area smaller than any of the second and sixth main electrode portions 21, 23. Namely, the third, fourth, and sixth main electrode portions 21 to 23 are formed stepwise.

The second lead electrode portion 24 has an end exposed at the second side face 4d and connected to the second terminal electrode 3. The end 21a of the third main electrode portion 21 on the first end face 4e side and the end 24a of the second lead electrode portion 24 on the first end face 4e side form the same line. Namely, the end 21a of the third main electrode portion 21 on the first end face 4e side and the end 24a of the second lead electrode portion 24 on the first end face 4e side coincide with each other at the boundary between the third main electrode portion 21 and second lead electrode portion 24.

The end 22a of the fourth main electrode portion 22 on the second end face 4f side and the end 24b of the second lead electrode portion 24 on the second end face 4f side form the same line. Namely, the end 22a of the fourth main electrode portion 22 on the second end face 4f side and the end 24b of the second lead electrode portion 24 on the second end face 4f side coincide with each other at the boundary between the fourth main electrode portion 22 and second lead electrode portion 24.

The first intermediate electrodes 31 are poisoned on the first end face 4e side of the second and third intermediate electrodes 32A to 32E, 33A to 33C in the opposing direction of the first and second end faces 4e, 4f. The first intermediate electrodes 31 are arranged at positions different from those of the first and second inner electrodes 10, 20 in the opposing direction of the first and second main faces 4a, 4b. Each first intermediate electrode 31 opposes both of the first main electrode portion 11 of the first inner electrode 10 and the third main electrode portion 21 of the second inner electrode 20 in the opposing direction of the first and second main faces 4a, 4b.

The second intermediate electrodes 32A to 32E are positioned on the second end face 4f side of the first and third intermediate electrodes 31, 33A to 33C in the opposing direction of the first and second end faces 4e, 4f. In the second intermediate electrodes 32A to 32E, three kinds of second inner electrodes 32A, 32C, 32E are arranged at positions different from those of the first and second inner electrodes 10, 20 in the opposing direction of the first and second main faces 4a, 4b. The remaining two kinds of second intermediate electrodes 32B, 32D in the second intermediate electrodes 32A to 32E are arranged on the same layers as with the first and second inner electrodes 10, 20 in the opposing direction of the first and second main faces 4a, 4b.

Specifically, the second intermediate electrodes 32A, 32C, 32E are arranged in this order from the first side face 4c side in the opposing direction of the first and second side faces 4c, 4d. The second intermediate electrodes 32B, 32D are arranged in this order from the first side face 4c side in the opposing direction of the first and second side faces 4c, 4d. The second intermediate electrodes 32B, 32D are positioned between the second main electrode portion 12 of the first inner electrode 10 and the fourth main electrode portion 22 of the second inner electrode 20.

The second intermediate electrode 32A positioned closest to the first side face 4c in the second intermediate electrodes 32A to 32E has a region opposing the second main electrode portion 12 in the opposing direction of the first and second main faces 4a, 4b. On the other hand, the second intermediate electrode 32E positioned closest to the second side face 4d in the second intermediate electrodes 32A to 32E has a region opposing the fourth main electrode portion 22 in the opposing direction of the first and second main faces 4a, 4b. Each of the second intermediate electrodes 32A to 32E has a region opposing another of the second intermediate electrodes in the opposing direction of the first and second main faces 4a, 4b.

Specifically, the second intermediate electrode 32A opposes the second main electrode portion 12 of the first inner electrode 10 in a region on the first side face 4c side and the second intermediate electrode 32B in a region on the second side face 4d side. The second intermediate electrode 32B opposes the second intermediate electrode 32A in a region on the first side face 4c side and the second intermediate electrode 32C in a region on the second side face 4d side. The second intermediate electrode 32C opposes the second intermediate electrode 32B in a region on the first side face 4c side and the second intermediate electrode 32D in a region on the second side face 4d side. The second intermediate electrode 32D opposes the second intermediate electrode 32C in a region on the first side face 4c side and the second intermediate electrode 32E in a region on the second side face 4d side. The second intermediate electrode 32E opposes the second intermediate electrode 32D in a region on the first side face 4c side and the fourth main electrode portion 22 of the second inner electrode 20 in a region on the second side face 4d side.

The third intermediate electrodes 33A to 33C are positioned between the first intermediate electrode 31 and the second intermediate electrodes 32A to 32E in the opposing direction of the first and second end faces 4e, 4f. Two kinds of third intermediate electrodes 33A, 33C in the third intermediate electrodes 33A to 33C are arranged at positions different from those of the first and second inner electrodes 10, 20 in the opposing direction of the first and second main faces 4a, 4b. The remaining one kind of third intermediate electrodes 33B in the third intermediate electrodes 33A to 33C are arranged on the same layers as with the first and second inner electrodes 10, 20 in the opposing direction of the first and second main faces 4a, 4b.

Specifically, the third intermediate electrodes 33A, 33C are arranged in this order from the first side face 4c side in the opposing direction of the first and second side faces 4c, 4d. The third intermediate electrode 33B is positioned between the fifth main electrode portion 13 of the first inner electrode 10 and the sixth main electrode portion 23 of the second inner electrode 20.

The third intermediate electrode 33A positioned closest to the first side face 4c in the third intermediate electrodes 33A to 33C has a region opposing the fifth main electrode portion 13 in the opposing direction of the first and second main faces 4a, 4b. On the other hand, the third intermediate electrode 33C positioned closest to the second side face 4d in the third intermediate electrodes 33A to 33C has a region opposing the sixth main electrode portion 23 in the opposing direction of the first and second main faces 4a, 4b. Each of the third intermediate electrodes 33A to 33C has a region opposing another of the third intermediate electrodes in the opposing direction of the first and second main faces 4a, 4b.

Specifically, the third intermediate electrode 33A opposes the fifth main electrode portion 13 of the first inner electrode 10 in a region on the first side face 4c side and the third intermediate electrode 33B in a region on the second side face 4d side. The third intermediate electrode 33B opposes the third intermediate electrode 33A in a region on the first side face 4c side and the third intermediate electrode 33C in a region on the second side face 4d side. The third intermediate electrode 33C opposes the third intermediate electrode 33B in a region on the first side face 4c side and the sixth main electrode portion 23 of the second inner electrode 20 in a region on the second side face 4d side.

FIG. 6 shows an equivalent circuit diagram of the multi-layer capacitor in accordance with the second embodiment. As shown in FIG. 6, the first main electrode portion 11 of the first inner electrode 10 and the first intermediate electrode 31 form a capacitance component C11. The first intermediate electrode 31 and the third main electrode portion 21 of the second inner electrode 20 form a capacitance component C12. Thus, the first intermediate electrode 31 forms a plurality of serially connected capacitance components C11, C12 with the first main electrode portion 11 of the first inner electrode 10 and the third main electrode portion 21 of the second inner electrode 20.

As shown in FIG. 6, the second main electrode portion 12 of the first inner electrode 10 and the second intermediate electrode 32A form a capacitance component C21. The second intermediate electrodes 32A, 32B form a capacitance component C22. The second intermediate electrodes 32B, 32C form a capacitance component C23. The second intermediate electrodes 32C, 32D form a capacitance component C24. The second intermediate electrodes 32D, 32E form a capacitance component C25. The second intermediate electrodes 32E and the fourth main electrode portion 22 of the second inner electrode 20 form a capacitance component C26. Thus, the second intermediate electrodes 32A to 32E form a plurality of serially connected capacitance components C21 to C26 with the second main electrode portion 12 of the first inner electrode 10 and the fourth main electrode portion 22 of the second inner electrode 20.

As shown in FIG. 6, the fifth main electrode portion 13 of the first inner electrode 10 and the third intermediate electrode 33A form a capacitance component C31. The third intermediate electrodes 33A, 33B form a capacitance component C32. The third intermediate electrodes 33B, 33C form a capacitance component C33. The third intermediate electrode 33C and the sixth main electrode portion 23 of the second inner electrode 20 form a capacitance component C34. Thus, the third intermediate electrodes 33A to 33C form a plurality of serially connected capacitance components C31 to C34 with the fifth main electrode portion 13 of the first inner electrode 10 and the sixth main electrode portion 23 of the second inner electrode 20.

As can be understood from FIG. 6, the sets of capacitance components C11, C12 formed by the first and second inner electrodes 10, 20 and first intermediate electrode 31, capacitance components C21 to C26 formed by the first and second inner electrodes 10, 20 and second intermediate electrodes 32A to 32E, and capacitance components C31 to C34 formed by the first and second inner electrodes 10, 20 and third intermediate electrodes 33A to 33C are connected in parallel.

The combined capacitance of the two capacitance components C11, C12 formed by the first intermediate electrode 31 and first and third main electrode portions 11, 21, the combined capacitance of the six capacitance components C21 to C26 formed by the second intermediate electrodes 32A to 32E and second and fourth main electrode portions 12, 22, and the combined capacitance of the four capacitance components C31 to C34 formed by the third intermediate electrodes 33A to 33C and fifth and sixth main electrode portions 13, 23 are connected in parallel, while exhibiting respective values different from each other.

In the multilayer capacitor in accordance with the second embodiment, the first and second terminal electrodes 2, 3 are formed on the first and second side faces 4c, 4d extending in the longitudinal direction of the capacitor body 4 having a rectangular parallelepiped form. This can shorten current paths through the first and second inner electrodes 10, 20, thereby lowering the equivalent series inductance of the multilayer capacitor in accordance with the second embodiment.

In the first inner electrode 10, the first, second, and fifth main electrode portions 11 to 13 contributing to forming the capacitance are arranged as wide as the first lead electrode portion 14 in the opposing direction of the first and second end faces 4e, 4f. This can further shorten the current path through the first inner electrode 10.

In the second inner electrode 20, the third, fourth, and sixth main electrode portions 21 to 23 contributing to forming the capacitance are arranged as wide as the second lead electrode portion 24 in the opposing direction of the first and second end faces 4e, 4f. This can further shorten the current path through the second inner electrode 20.

By contriving the relationship between the portions contributing to forming the capacitance and the lead electrode portions in the first and second inner electrodes 10, 20 as mentioned above, the multilayer capacitor in accordance with the second embodiment shortens the paths of currents flowing through the inner electrodes, whereby the equivalent series inductance can further be lowered.

In the multilayer capacitor in accordance with the second embodiment, combined capacitances differ among the plurality of serially connected capacitance components C11, C12 formed by the first and second inner electrodes 10, 20 and first intermediate electrode 31, the plurality of serially connected capacitance components C21 to C26 formed by the first and second inner electrodes 10, 20 and second intermediate electrodes 32A to 32E, and the plurality of serially connected capacitance components C31 to C34 formed by the first and second inner electrodes 10, 20 and third intermediate electrodes 33A to 33C. As shown in FIG. 6, these different combined capacitances are connected in parallel, whereby the multilayer capacitor in accordance with the second embodiment can lower impedance over a wide frequency band.

The multilayer capacitor in accordance with the second embodiment has the first to third intermediate electrodes 31 to 33 by respective numbers different from each other, with which the first and second inner electrodes 10, 20 form capacitances. Therefore, varying the numbers of the intermediate electrodes 31 to 33 can diversify the combined capacitances connected in parallel within the multilayer capacitor in accordance with the second embodiment. For example, further increasing the difference between the number of the first intermediate electrodes 31 and that of the second intermediate electrodes 32A to 32E can enhance the difference between their combined capacitances, so as to increase the difference among the combined capacitances connected in parallel, whereby the impedance can be lowered over a wider band. Namely, the values of capacitances generated between the first and second inner electrodes 10, 20 can be diversified by the number of intermediate electrodes arranged between the first and second inner electrodes 10, 20.

Third Embodiment

Figure 7:
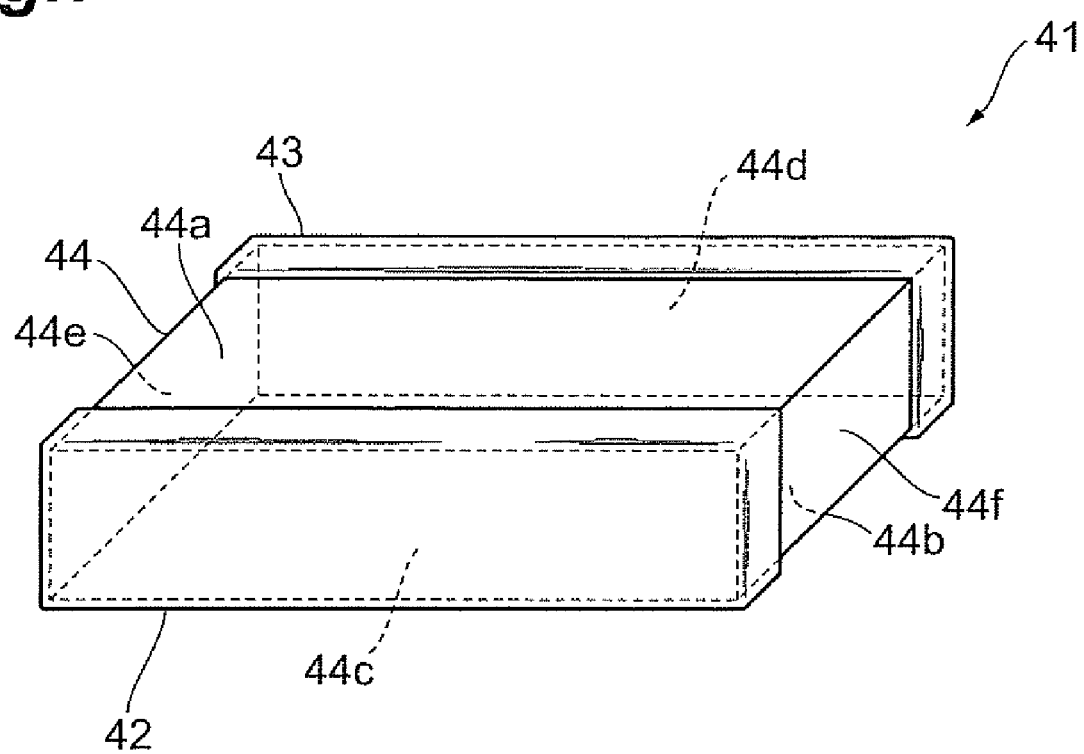
FIG. 7 is a perspective view of the multilayer capacitor in accordance with a third embodiment.
Figure 8:
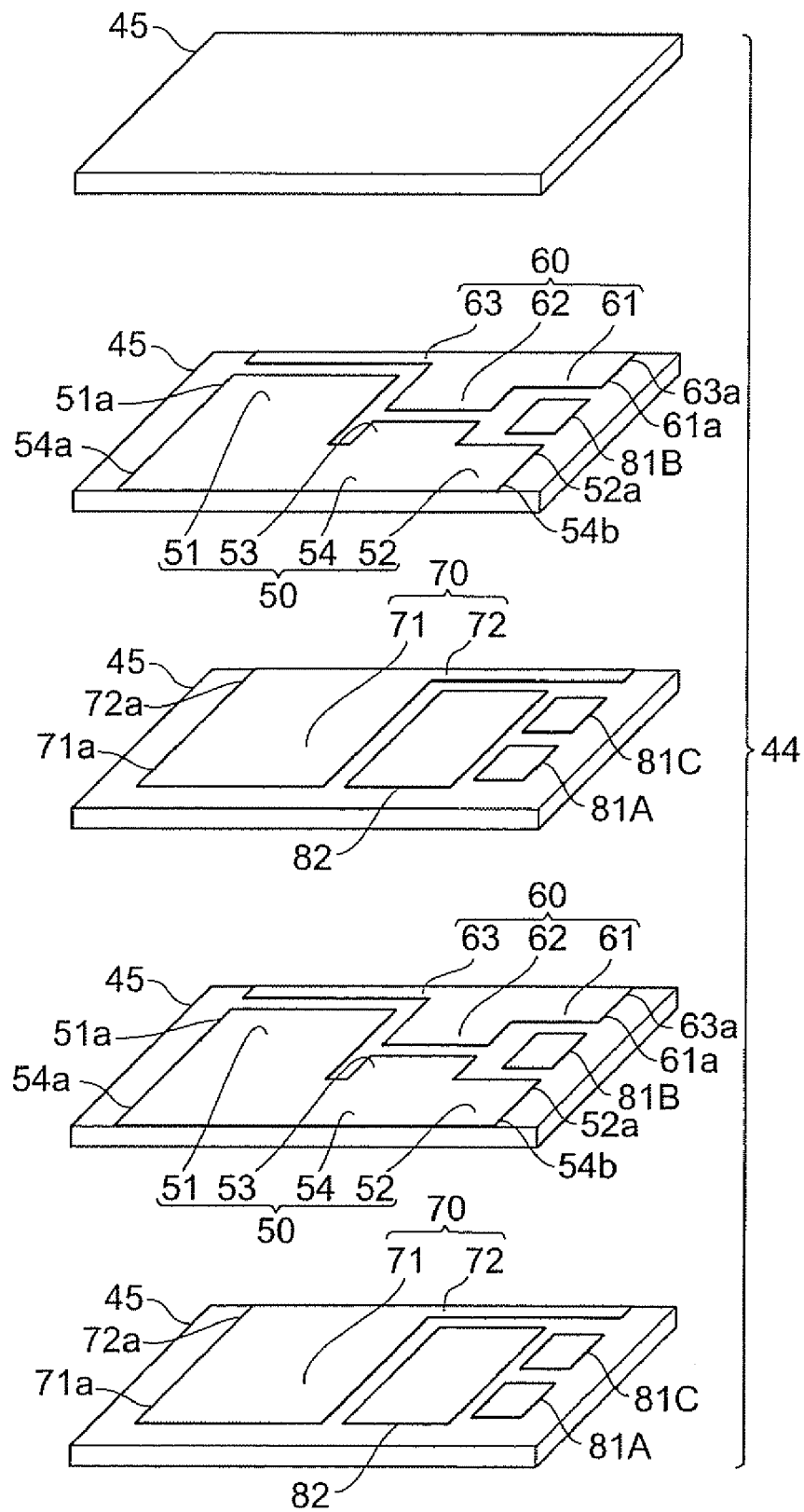
FIG. 8 is an exploded perspective view of the capacitor body included in the multilayer capacitor in accordance with the third embodiment.
Figure 9:
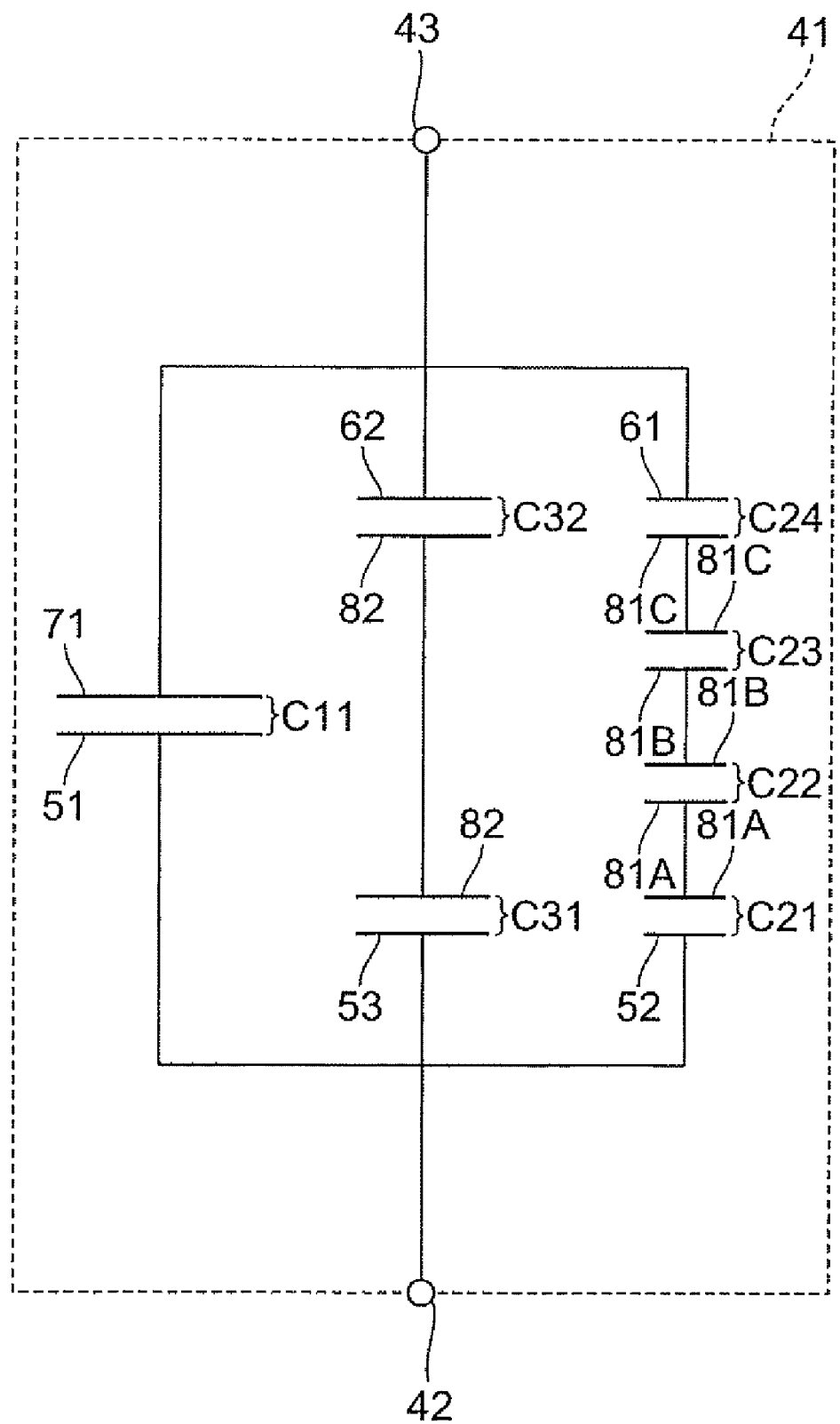
FIG. 9 is an equivalent circuit diagram of the multilayer capacitor in accordance with the third embodiment.

With reference to FIGS. 7 to 9, the structure of the multilayer capacitor 41 in accordance with the third embodiment will be explained. FIG. 7 is a perspective view of the multilayer capacitor in accordance with this embodiment. FIG. 8 is an exploded perspective view of the capacitor body included in the multilayer capacitor in accordance with this embodiment. FIG. 9 is an equivalent circuit diagram of the multilayer capacitor in accordance with this embodiment.

As shown in FIG. 7, the multilayer capacitor 41 comprises a capacitor body 44 having a rectangular parallelepiped form, and a first terminal electrode 42 and a second terminal electrode 43 which are arranged on outer surfaces of the capacitor body 44. As shown in FIG. 7, the capacitor body 44 has rectangular first and second main faces 44a, 44b opposing each other, first and second side faces 44c, 44d extending in the longer side direction of the first and second main faces 44a, 44b so as to connect the first and second main faces 44a, 44b to each other, and first and second end faces 44e, 44f extending in the shorter side direction of the first and second main faces 44a, 44b so as to connect the first and second main faces 44a, 44b to each other.

The first terminal electrode 42 is arranged on the first side face 44c of the capacitor body 44. The second terminal electrode 43 is arranged on the second side face 44d of the capacitor body 44. The first and second terminal electrodes 42, 43 are formed, for example, by applying and burning a conductive paste containing a conductive metal powder and glass frit onto their corresponding outer surfaces of the capacitor body 44. A plating layer may be formed on the burned electrode when necessary.

As shown in FIG. 8, the capacitor body has a plurality of (5 in this embodiment) laminated dielectric layers 45. Each dielectric layer 45 is constituted by a sintered body of a ceramic green sheet containing a dielectric ceramic, for example. Therefore, the capacitor body 44 exhibits a dielectric characteristic. In the multilayer capacitor 41 in practice, the dielectric layers 45 are integrated to such an extent that their boundaries are indiscernible.

As shown in FIG. 8, a plurality of (2 in this embodiment) first inner electrodes 50, a plurality of (2 in this embodiment) second inner electrodes 60, a plurality of (2 in this embodiment) third inner electrodes 70, a plurality of (6 in this embodiment) first intermediate electrodes 81A to 81C, and a plurality of (2 in this embodiment) second intermediate electrodes 82 are arranged within the capacitor body 4. Each of the inner electrodes 50, 60 and intermediate electrodes 81A to 81C, 82 is constituted by a sintered body of a conductive paste, for example.

In the capacitor body 44, a pair of first and second inner electrodes 50, 60 and one first intermediate electrode 81B are arranged on the same layer in the opposing direction of the first and second main faces 44a, 44b of the capacitor body 44. In the capacitor body 44, one third inner electrode 70 and a set of first and second intermediate electrodes 81A, 81C, 82 are arranged on the same layer in the opposing direction of the first and second main faces 44a, 44b of the capacitor body 44. The layers arranged with the respective sets of first and second inner electrodes 50, 60 and first intermediate electrode 81B alternate with the layers arranged with the respective sets of first and second intermediate electrodes 81A, 81C, 82 in the opposing direction of the first and second main faces 44a, 44b.

Each first inner electrode 50 includes a first main electrode portion 51, a fifth main electrode portion 53, and a second main electrode portion 52 which are continuously arranged in a row along the opposing direction of the first and second end faces 44e, 44f, and a first lead electrode portion 54 extending from the first, second, and fifth main electrode portions 51, 52, 53 to the first side face 44c. The first main electrode portion 51, fifth main electrode portion 53, and second main electrode portion 52 are positioned in this order from the first end face 44e side to the second end face 44f side.

The first main electrode portion 51 has an area greater than any of the second and fifth main electrode portions 52, 53 and is formed such as to project more toward the second side face 44d than the second and fifth main electrode portions 52, 53 do. The fifth main electrode portion 53 has an area smaller than the first main electrode portion 51 but greater than the second main electrode portion 52. The fifth main electrode portion 53 is formed such as to project more toward the second side face 44d than the second main electrode portion 52 does. The second main electrode portion 52 has an area smaller than any of the first and fifth main electrode portions 51, 53. Namely, the first, second, and fifth main electrode portions 51 to 53 are formed stepwise.

The first lead electrode portion 54 has an end exposed at the first side face 44c and connected to the first terminal electrode 42. The end 51a of the first main electrode portion 51 on the first end face 44e side and the end 54a of the first lead electrode portion 54 on the first end face 44e side form the same line. Namely, the end 51a of the first main electrode portion 51 on the first end face 44e side and the end 54a of the first lead electrode portion 54 on the first end face 44e side coincide with each other at the boundary between the first main electrode portion 51 and first lead electrode portion 54.

The end 52a of the second main electrode portion 52 on the second end face 44f side and the end 54b of the first lead electrode portion 54 on the second end face 44f side form the same line. Namely, the end 52a of the second main electrode portion 52 on the second end face 44f side and the end 54b of the first lead electrode portion 54 on the second end face 44f side coincide with each other at the boundary between the second main electrode portion 52 and first lead electrode portion 54.

Each second inner electrode 60 includes a third main electrode portion 61 and a sixth main electrode portion 62 which are continuously arranged in a row along the opposing direction of the first and second end faces 44e, 44f, and a second lead electrode portion 63 extending from the third and sixth main electrode portions 61, 62 to the second side face 44d. The sixth main electrode portion 62 and third main electrode portion 61 are positioned in this order from the first end face 44e side to the second end face 44f side. The sixth main electrode portion 62 has an area greater than the third main electrode portion 61 and is formed such as to project more toward the first side face 44c than the third main electrode portion 61 does.

The second lead electrode portion 63 has an end exposed at the second side face 44d and connected to the second terminal electrode 43. In the opposing direction of the first and second end faces 44e, 44f, the second lead electrode portion 63 has the same length as that of the first lead electrode portion 54. Here, the end 61a of the third main electrode portion 61 on the second end face 44f side and the end 63a of the second lead electrode portion 63 on the second end face 44f side form the same line. Namely, the end 61a of the third main electrode portion 61 on the second end face 44f side and the end 63a of the second lead electrode portion 63 on the second end face 44f side coincide with each other at the boundary between the third main electrode portion 61 and second lead electrode portion 63.

Each third inner electrode 70 includes a fourth main electrode portion 71 and a third lead electrode portion 72 which extends from the fourth main electrode portion 71 to the second side face 44d. The third lead electrode portion 72 has an end exposed at the second side face 44d and connected to the second terminal electrode 43. In the opposing direction of the first and second end faces 44e, 44f, the third lead electrode portion 72 has the same length as that of the first lead electrode portion 54 of the first inner electrode 50. Here, the end 71a of the fourth main electrode portion 71 on the first end face 44e side and the end 72a of the third lead electrode portion 72 on the first end face 44e side form the same line. Namely, the end 71a of the fourth main electrode portion 71 on the first end face 44e side and the end 72a of the third lead electrode portion 72 on the first end face 44e side coincide with each other at the boundary between the fourth main electrode portion 71 and third lead electrode portion 72. The fourth main electrode portion 71 of the third inner electrode 70 opposes the first main electrode portion 51 of the first inner electrode 50 in the opposing direction of the first and second main faces 44a, 44b.

The first intermediate electrodes 81A to 81C are positioned on the second end face 44f side of the first main electrode portion 71 of the third inner electrode 70 and the second intermediate electrode 82 in the opposing direction of the first and second end faces 44e, 44f. Two kinds of first intermediate electrodes 81A, 81C in the first intermediate electrodes 81A to 81C are arranged at positions different from those of the first and second inner electrodes 50, 60 in the opposing direction of the first and second main faces 44a, 44b. The remaining one kind of first intermediate electrodes 81B in the first intermediate electrodes 81A to 81C are arranged on the same layers as with the first and second inner electrodes 50, 60 in the opposing direction of the first and second main faces 44a, 44b.

Specifically, the first intermediate electrodes 81A, 81C are arranged in this order from the first side face 44c side in the opposing direction of the first and second side faces 44c, 44d. The first intermediate electrode 81B is positioned between the second main electrode portion 52 of the first inner electrode 50 and the third main electrode portion 61 of the second inner electrode 60.

The first intermediate electrode 81A positioned closest to the first side face 44c in the first intermediate electrodes 81A to 81C has a region opposing the second main electrode portion 52 of the first inner electrode 50 in the opposing direction of the first and second main faces 44a, 44b. On the other hand, the first intermediate electrode 81C positioned closest to the second side face 44d in the first intermediate electrodes 81A to 81C has a region opposing the third main electrode portion 61 of the second inner electrode 60 in the opposing direction of the first and second main faces 44a, 44b. Each of the first intermediate electrodes 81A to 81C has a region opposing another of the third intermediate electrodes in the opposing direction of the first and second main faces 44a, 44b.

Specifically, the first intermediate electrode 81A opposes the second main electrode portion 52 of the first inner electrode 50 in a region on the first side face 44c side and the first intermediate electrode 81B in a region on the second side face 44d side. The first intermediate electrode 81B opposes the first intermediate electrode 81A in a region on the first side face 44c side and the first intermediate electrode 81C in a region on the second side face 44d side. The first intermediate electrode 81C opposes the first intermediate electrode 81B in a region on the first side face 44c side and the third main electrode portion 61 of the second inner electrode 60 in a region on the second side face 44d side.

Each second intermediate electrode 82 is positioned between the fourth main electrode portion 71 of the third inner electrode 70 and the first intermediate electrodes 81A to 81C in the opposing direction of the first and second end faces 44e, 44f. The second intermediate electrodes 82 are arranged at positions different from those of the first and second inner electrodes 50, 60 in the opposing direction of the first and second main faces 44a, 44b. Each second intermediate electrode 82 opposes both of the third main electrode portion 53 of the first inner electrode 50 and the second main electrode portion 62 of the second inner electrode 60 in the opposing direction of the first and second main faces 44a, 44b.

FIG. 9 shows an equivalent circuit diagram of the multilayer capacitor in accordance with the third embodiment. As shown in FIG. 9, the first main electrode portion 51 of the first inner electrode 50 and the fourth main electrode portion 71 of the third inner electrode 70 form one capacitance component C11.

As shown in FIG. 9, the second main electrode portion 52 of the first inner electrode 50 and the first intermediate electrode 81A form a capacitance component C21. The first intermediate electrodes 81A, 81B form a capacitance component C22. The first intermediate electrodes 81B, 81C form a capacitance component C23. The first intermediate electrode 81C and the third main electrode portion 61 of the second inner electrode 60 form a capacitance component C24. Thus, the first intermediate electrodes 81A to 81C form a plurality of serially connected capacitance components C21 to C24 with the second main electrode portion 52 of the first inner electrode 50 and the third main electrode portion 61 of the second inner electrode 60.

As shown in FIG. 9, the fifth main electrode portion 53 of the first inner electrode 50 and the second intermediate electrode 82 form a capacitance component C31. The second intermediate electrode 82 and the sixth main electrode portion 62 of the second inner electrode 60 form a capacitance component C32. Thus, the second intermediate electrode 82 forms a plurality of serially connected capacitance components C31, C32 with the fifth main electrode portion 53 of the first inner electrode 50 and the sixth main electrode portion 62 of the second inner electrode 60.

As can be understood from FIG. 9, the sets of capacitance component C11 formed by the first and third inner electrodes 50, 70, capacitance components C21 to C24 formed by the first and second inner electrodes 50, 60 and first intermediate electrodes 81A to 81C, and capacitance components C31, C32 formed by the first and second inner electrodes 50, 60 and second intermediate electrode 82 are connected in parallel.

One capacitance component C11 formed by the first and third main electrode portions 51, 71, the combined capacitance of the four capacitance components C21 to C24 formed by the first intermediate electrodes 81A to 81C and second and third main electrode portions 52, 61, and the combined capacitance of the two capacitance components C31, C32 formed by the second intermediate electrode 82 and fifth and sixth main electrode portions 53, 62 are connected in parallel, while exhibiting respective values different from each other.

In the multilayer capacitor in accordance with the third embodiment, the first and second terminal electrodes 42, 43 are formed on the first and second side faces 44c, 44d extending in the longitudinal direction of the capacitor body 44 having a rectangular parallelepiped form. This can shorten current paths through the first to third inner electrodes 50, 60, 70, thereby lowering the equivalent series inductance of the multilayer capacitor in accordance with the third embodiment.

In the first inner electrode 50, the first, second, and fifth main electrode portions 51 to 53 contributing to forming the capacitance are arranged as wide as the first lead electrode portion 54 in the opposing direction of the first and second end faces 44e, 44f. This can further shorten the current path through the first inner electrode 50.

By contriving the relationship between the main electrode portions 51 to 53 and lead electrode portion 54 contributing to forming the capacitance in the first inner electrode 50 as mentioned above, the multilayer capacitor 41 shortens the paths of currents flowing through the inner electrodes. This can further lower the equivalent series inductance of the multilayer capacitor 41.

In the opposing direction of the first and second end faces 44e, 44f in the multilayer capacitor 41, the second lead electrode portion 63 of the second inner electrode 60 has the same length as that of the first lead electrode portion 54 of the first inner electrode 50. Also, in the opposing direction of the first and second end faces 44e, 44f, the third lead electrode portion 72 of the third inner electrode 70 has the same length as that of the first lead electrode portion 54 of the first inner electrode 50. This allows the multilayer capacitor 41 to further lower the equivalent series inductance.

In the multilayer capacitor 41, combined capacitances differ among the capacitance component C11 formed by the first and third inner electrodes 50, 70, the combined capacitance of the plurality of serially connected capacitance components C21 to C24 formed by the first and second inner electrodes 50, 60 and first intermediate electrodes 81A to 81C, and the combined capacitance of the plurality of serially connected capacitance components C31, C32 formed by the first and second inner electrodes 50, 60 and second intermediate electrode 82. As shown in FIG. 9, these different capacitances are connected in parallel, whereby the multilayer capacitor 41 can lower impedance over a wide frequency band.

In particular, the capacitance C11 formed by only the inner electrodes directly connected to terminal electrodes and a plurality of capacitance components (e.g., C21 to C24) formed in series through intermediate electrodes are connected in parallel in the multilayer capacitor 41. The capacitance formed by only the inner electrodes directly connected to the terminal electrodes and the combined capacitance of a plurality of capacitance components formed in series through the intermediate electrodes can increase the difference between their values. Therefore, the multilayer capacitor 41 can lower impedance over a wider frequency band.

The multilayer capacitor 41 has the first and second intermediate electrodes 81A to 81C, 82 by respective numbers different from each other, with which the first and second inner electrodes 50, 60 form capacitances. Therefore, varying the numbers of the intermediate electrodes 81A to 81C, 82 can diversify the combined capacitances connected in parallel within the multilayer capacitor 41.

Fourth Embodiment

Figure 10:
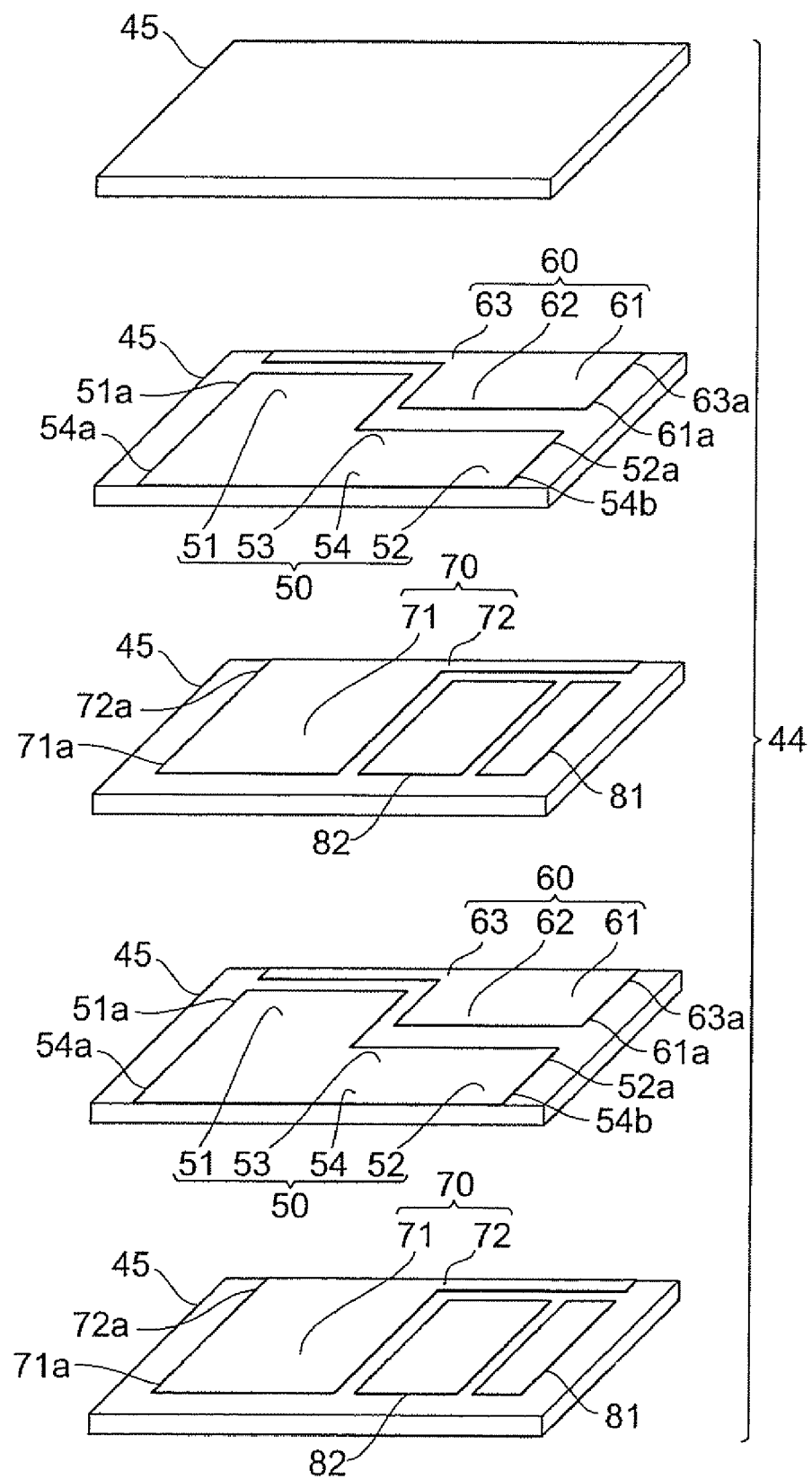
FIG. 10 is an exploded perspective view of the capacitor body included in the multilayer capacitor in accordance with a fourth embodiment.
Figure 11:
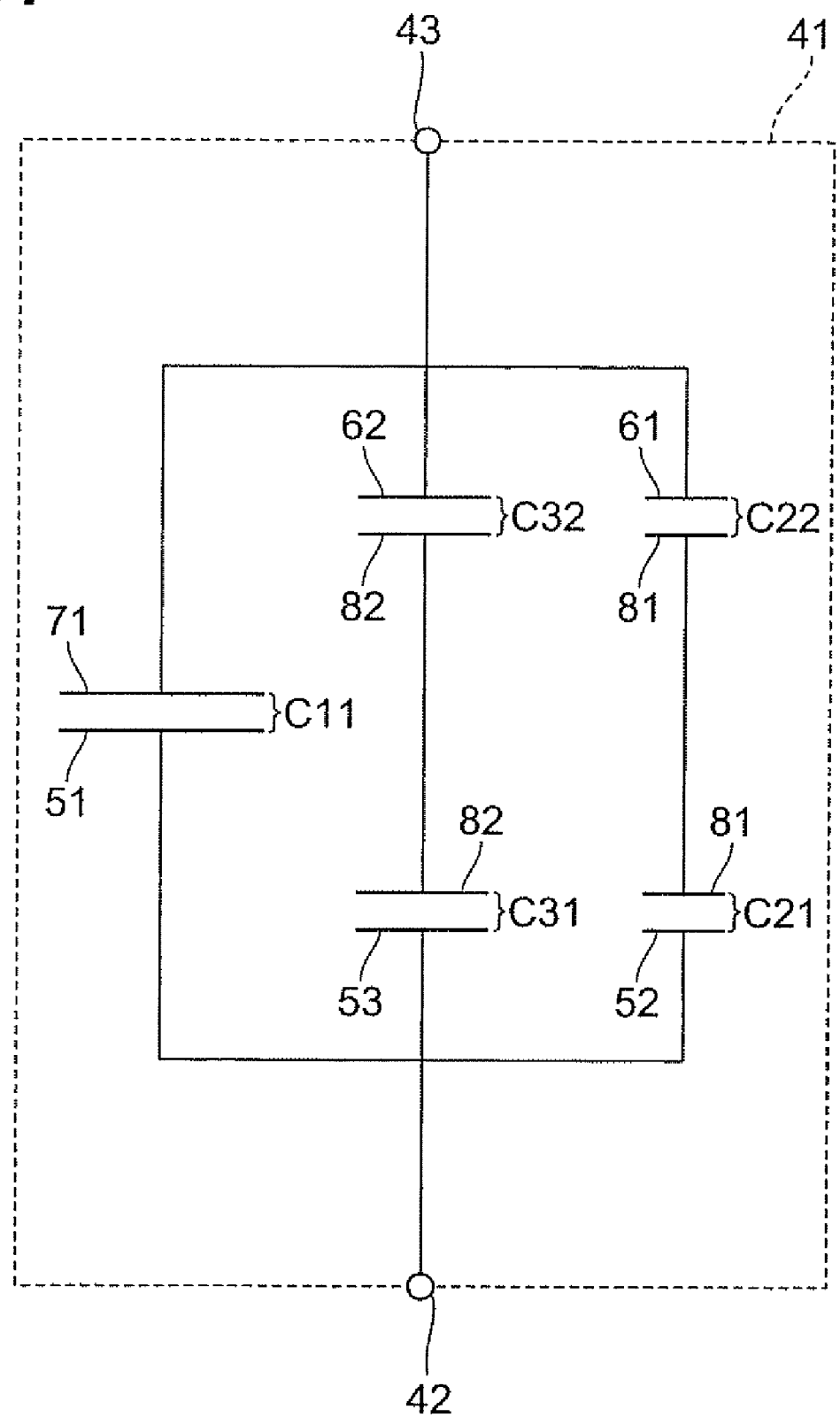
FIG. 11 is an equivalent circuit diagram of the multilayer capacitor in accordance with the fourth embodiment.

With reference to FIGS. 10 and 11, the structure of the multilayer capacitor in accordance with the fourth embodiment will be explained. The multilayer capacitor in accordance with the fourth embodiment differs from the multilayer capacitor in accordance with the third embodiment in terms of the number of intermediate electrodes. FIG. 10 is an exploded perspective view of the capacitor body included in the multilayer capacitor in accordance with the fourth embodiment. FIG. 11 is an equivalent circuit diagram of the multilayer capacitor in accordance with the fourth embodiment.

Though not depicted, the multilayer capacitor in accordance with the fourth embodiment comprises a capacitor body 44, a first terminal electrode 42, and a second terminal electrode 43 as with the multilayer capacitor 41 in accordance with the third embodiment. As shown in FIG. 10, the capacitor body 44 has a plurality of (5 in this embodiment) laminated dielectric layers 45.

As shown in FIG. 8, a plurality of (2 in this embodiment) first inner electrodes 50, a plurality of (2 in this embodiment) second inner electrodes 60, a plurality of (2 in this embodiment) third inner electrodes 70, a plurality of (2 in this embodiment) first intermediate electrodes 81, and a plurality of (2 in this embodiment) second intermediate electrodes 82 are arranged in the capacitor body 44.

In the capacitor body 44, a pair of first and second inner electrodes 50, 60 are arranged on the same layer in the opposing direction of the first and second main faces 44a, 44b of the capacitor body 44. In the capacitor body 44, the third inner electrode 70 and first and second intermediate electrodes 81, 82 are arranged on the same layer in the opposing direction of the first and second main faces 44a, 44b of the capacitor body 44. The layers arranged with the respective pairs of first and second inner electrodes 50, 60 alternate with the layers arranged with the respective sets of third inner electrodes 70 and first and second intermediate electrodes 81, 82 in the opposing direction of the first and second main faces 44a, 44b.

Each first inner electrode 50 includes a first main electrode portion 51, a fifth main electrode portion 53, and a second main electrode portion 52 which are continuously arranged in a row along the opposing direction of the first and second end faces 44e, 44f, and a first lead electrode portion 54 extending from the first, second, and fifth main electrode portions 51, 52, 53 to the first side face 44c. The first main electrode portion 51, fifth main electrode portion 53, and second main electrode portion 52 are positioned in this order from the first end face 44e side to the second end face 44f side, The first main electrode portion 51 has an area greater than any of the second and fifth main electrode portions 52, 53 and is formed such as to project more toward the second side face 44d than the second and fifth main electrode portions 52, 53 do.

In the opposing direction of the first and second side faces 44c, 44d, the second and fifth main electrode portions 52, 53 have the same length. The end of the second main electrode portion 52 on the second side face 44d side and the end of the fifth main electrode portion 53 on the second side face 44d side are positioned on the same line. In the opposing direction of the first and second end faces 44e, 44f, on the other hand, the second main electrode portion 52 is shorter than the fifth main electrode portion 53.

The first lead electrode portion 54 has an end exposed at the first side face 44c and connected to the first terminal electrode 42. The end 51a of the first main electrode portion 51 on the first end face 44e side and the end 54a of the first lead electrode portion 54 on the first end face 44e side form the same line. Namely, the end 51a of the first main electrode portion 51 on the first end face 44c side and the end 54a of the first lead electrode portion 54 on the first end face 44e side coincide with each other at the boundary between the first main electrode portion 51 and first lead electrode portion 54.

The end 52a of the second main electrode portion 52 on the second end face 44f side and the end 54b of the first lead electrode portion 54 on the second end face 44f side form the same line.

Namely, the end 52a of the second main electrode portion 52 on the second end face 44f side and the end 54b of the first lead electrode portion 54 on the second end face 44f side coincide with each other at the boundary between the second main electrode portion 52 and first lead electrode portion 54.

Each second inner electrode 60 includes a third main electrode portion 61 and a sixth main electrode portion 62 which are continuously arranged in a row along the opposing direction of the first and second end faces 44e, 44f, and a second lead electrode portion 63 extending from the third and sixth main electrode portions 61, 62 to the second side face 44d. The sixth main electrode portion 62 and third main electrode portion 61 are positioned in this order from the first end face 44e side to the second end face 44f side.

In the opposing direction of the first and second side faces 44c, 44d, the third and sixth main electrode portions 61, 62 have the same length. The end of the third main electrode portion 61 on the first side face 44c side and the end of the sixth main electrode portion 62 on the first side face 44c side are positioned on the same line. In the opposing direction of the first and second end faces 44e, 44f on the other hand, the third main electrode portion 61 is shorter than the sixth main electrode portion 62.

The second lead electrode portion 63 has an end exposed at the second side face 44d and connected to the second terminal electrode 43. In the opposing direction of the first and second end faces 44e, 44f, the second lead electrode portion 63 has the same length as that of the first lead electrode portion 54 of the first inner electrode 50. Here, the end 61a of the third main electrode portion 61 on the second end face 44f side and the end 63a of the second lead electrode portion 63 on the second end face 44f side form the same line. Namely, the end 61a of the third main electrode portion 61 on the second end face 44f side and the end 63a of the second lead electrode portion 63 on the second end face 44f side coincide with each other at the boundary between the third main electrode portion 61 and second lead electrode portion 63.

Each third inner electrode 70 includes a fourth main electrode portion 71 and a third lead electrode portion 72 extending from the fourth main electrode portion 71 to the second side face 44d. The third lead electrode portion 72 has an end exposed at the second side face 44d and connected to the second terminal electrode 43, In the opposing direction of the first and second end faces 44e, 44f, the third lead electrode portion 72 has the same length as that of the first lead electrode portion 54 of the first inner electrode 50. Here, the end 71a of the fourth main electrode portion 71 on the first end face 44e side and the end 72a of the third lead electrode portion 72 on the first end face 44e side form the same line. Namely, the end 71a of the fourth main electrode portion 71 on the first end face 44e side and the end 72a of the third lead electrode portion 72 on the first end face 44e side coincide with each other at the boundary between the fourth main electrode portion 71 and third lead electrode portion 72. In the opposing direction of the first and second main faces 44a, 44b, the fourth main electrode portion 71 of the third inner electrode 70 opposes the first main electrode portion 51 of the first inner electrode 50.

Each first intermediate electrode 81 is positioned on the second end face 44f side of the fourth main electrode portion 71 of the third inner electrode 70 and the second intermediate electrode 82 in the opposing direction of the first and second end faces 44e, 44f. The first intermediate electrode 81 is arranged such as to bridge the second main electrode portion 52 of the first inner electrode 50 and the third main electrode portion 61 of the second inner electrode 60 when seen in the opposing direction of the first and second main faces 44a, 44b. As a consequence, the first intermediate electrode 81 opposes the second main electrode portion 52 of the first inner electrode 50 in a region on the first side face 44c side and the third main electrode portion 61 of the second inner electrode 60 in a region on the second side face 44d side.

Each second intermediate electrode 82 is positioned between the fourth main electrode portion 71 of the third inner electrode 70 and the first intermediate electrode 81. The second intermediate electrode 82 is arranged such as to bridge the fifth main electrode portion 53 of the first inner electrode 50 and the sixth main electrode portion 62 of the second inner electrode 60 when seen in the opposing direction of the first and second main faces 44a, 44b. As a consequence, the second intermediate electrode 82 opposes the fifth main electrode portion 53 of the first inner electrode 50 in a region on the first side face 44c side and the sixth main electrode portion 62 of the second inner electrode 60 in a region on the second side face 44d side.

The first intermediate electrode 81 has an area smaller than the second intermediate electrode 82.

FIG. 11 shows an equivalent circuit diagram of the multilayer capacitor in accordance with the fourth embodiment. As shown in FIG. 11, the first main electrode portion 51 of the first inner electrode 50 and the fourth main electrode portion 71 of the third inner electrode 70 form one capacitance component C11.

As shown in FIG. 11, the second main electrode portion 52 of the first inner electrode 50 and the first intermediate electrode 81 form a capacitance component C21. The first intermediate electrode 81 and the third main electrode portion 61 of the second inner electrode 60 form a capacitance component C22. Thus, the first intermediate electrode 81 forms a plurality of serially connected capacitance components C21, C22 with the second main electrode portion 52 of the first inner electrode 50 and the third main electrode portion 61 of the second inner electrode 60.

As shown in FIG. 11, the fifth main electrode portion 53 of the first inner electrode 50 and the second intermediate electrode 82 form a capacitance component C31. The second intermediate electrode 82 and the sixth main electrode portion 62 of the second inner electrode 60 form a capacitance component C32. Thus, the second intermediate electrode 82 forms a plurality of serially connected capacitance components C31, C32 with the fifth main electrode portion 53 of the first inner electrode 50 and the sixth main electrode portion 62 of the second inner electrode 60.

As can be understood from FIG. 11, the capacitance component C11 formed by the first and third inner electrodes 50, 70, the capacitance components C21, C22 formed by the first and second inner electrodes 50, 60 and first intermediate electrode 81, and the capacitance components C31, C32 formed by the first and second inner electrodes 50, 60 and second intermediate electrode 82 are connected in parallel.

One capacitance component C11 formed by the first and third main electrode portions 51, 71, the combined capacitance of the two capacitance components C21, C22 formed by the first intermediate electrode 81 and second and third main electrode portions 52, 61, and the combined capacitance of the two capacitance components C31, C32 formed by the second intermediate electrode 82 and fifth and sixth main electrode portions 53, 62 are connected in parallel, while exhibiting respective values different from each other.

In the multilayer capacitor in accordance with the fourth embodiment, the first and second terminal electrodes 42, 43 are formed on the first and second side faces 44c, 44d extending in the longitudinal direction of the capacitor body 44 having a rectangular parallelepiped form. This can shorten current paths through the first to third inner electrodes 50, 60, 70, thereby lowering the equivalent series inductance of the multilayer capacitor in accordance with the fourth embodiment.

In the first inner electrode 50, the first, second, and fifth main electrode portions 51 to 53 contributing to forming the capacitance are arranged as wide as the first lead electrode portion 54 in the opposing direction of the first and second end faces 44e, 44f. This can further shorten the current path through the first inner electrode 50.

By contriving the relationship between the main electrode portions 51 to 53 and lead electrode portion 54 contributing to forming the capacitance in the first inner electrode 50 as mentioned above, the multilayer capacitor in accordance with the fourth embodiment shortens the paths of currents flowing through the inner electrodes. This can further lower the equivalent series inductance of the multilayer capacitor in accordance with the fourth embodiment.

In the opposing direction of the first and second end faces 44e, 44f in the multilayer capacitor in accordance with the fourth embodiment, the second lead electrode portion 63 of the second inner electrode 60 has the same length as that of the first lead electrode portion 54 of the first inner electrode 50. Also, in the opposing direction of the first and second end faces 44e, 44f, the third lead electrode portion 72 of the third inner electrode 70 has the same length as that of the first lead electrode portion 54 of the first inner electrode 50. This allows the multilayer capacitor in accordance with the fourth embodiment to further lower the equivalent series inductance.

In the multilayer capacitor in accordance with the fourth embodiment, combined capacitances differ among the capacitance component C11 formed by the first and third inner electrodes 50, 70, the combined capacitance of the plurality of serially connected capacitance components C21, C22 formed by the first and second inner electrodes 50, 60 and first intermediate electrode 81, and the combined capacitance of the plurality of serially connected capacitance components C31, C32 formed by the first and second inner electrodes 50, 60 and second intermediate electrode 82. As shown in FIG. 11, these different capacitances are connected in parallel, whereby the multilayer capacitor in accordance with the fourth embodiment can lower impedance over a wide frequency band.

In particular, the capacitance C11 formed by only the inner electrodes directly connected to terminal electrodes and a plurality of capacitance components (e.g., C21, C22) formed in series through intermediate electrodes are connected in parallel in the multilayer capacitor in accordance with the fourth embodiment. The capacitance formed by only the inner electrodes directly connected to the terminal electrodes and the combined capacitance of a plurality of capacitance components formed in series through the intermediate electrodes can increase the difference between their values. Therefore, the multilayer capacitor in accordance with the fourth embodiment can lower impedance over a wider frequency band.

In the multilayer capacitor in accordance with the fourth embodiment, the first intermediate electrode 81 has an area smaller than the second intermediate electrode 82. This allows the capacitance formed by the first and second inner electrodes 61, 62 and first intermediate electrode 81 and the capacitance formed by the first and second inner electrodes 61, 62 and second intermediate electrode 82 to attain values different from each other.

The multilayer capacitor in accordance with the fourth embodiment has the first and second intermediate electrodes 81, 82 having respective areas different from each other, with which the first and second inner electrodes 50, 60 form capacitances. Therefore, varying the areas of the intermediate electrodes 81, 82 can diversify the combined capacitances connected in parallel within the multilayer capacitor in accordance with the fourth embodiment.

In the multilayer capacitors in accordance with the third and fourth embodiments, the length of the second lead electrode portion 63 of the second inner electrode 60 may differ from that of the first lead electrode portion 54 of the first inner electrode 50 in the opposing direction of the first and second end faces 44e, 44f. For example, the length of the second lead electrode portion 63 may be identical to that of the third and sixth main electrode portions 61, 62 in the opposing direction of the first and second end faces 44e, 44f. Namely, the second lead electrode portion 63 may extend straight from the third and sixth main electrode portions 61, 62 to the second side face 44d.

In the opposing direction of the first and second end faces 44e, 44f, the length of the third lead electrode portion 72 of the third inner electrode 70 may differ from that of the first lead electrode portion 54 of the first inner electrode 50. Therefore, in the opposing direction of the first and second end faces 44e, 44f, the length of the third lead electrode portion 72 may be identical to that of the fourth main electrode portion 71. Namely, the third lead electrode portion 72 may extend straight from the fourth main electrode portion 71 to the second side face 44d.

Though the preferred embodiments of the present invention are explained in the foregoing, the present invention is not necessarily restricted to the above-mentioned embodiments but can be modified in various manners within the scope not deviating from the gist thereof. For example, the numbers of laminations of dielectric layers 5, 45, inner electrodes 10, 20, 50, 60, 70, and intermediate electrodes 31 to 33, 32A to 32E, 33A to 33C, 81, 82, 81A to 81C are not limited to those in the above-mentioned embodiments.

The forms of main electrode portions of inner electrodes 10, 20, 50, 60, 70 are not limited to those in the above-mentioned embodiments. The numbers of main electrode portions of inner electrodes 10, 20, 50, 60, 70 are not limited to those in the above-mentioned embodiments. The forms of intermediate electrodes 31 to 33, 32A to 32E, 33A to 33C, 81, 82, 81A to 81C are not limited to those in the above-mentioned embodiments.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:
   a capacitor body having rectangular first and second main faces opposing each other, first and second end faces extending in a shorter side direction of the first and second main faces so as to connect the first and second main faces to each other, and first and second side faces extending in a longer side direction of the first and second main faces so as to connect the first and second main faces to each other, the capacitor body exhibiting a dielectric characteristic;
   a plurality of terminal electrodes arranged on the capacitor body, the plurality of terminal electrodes including a first terminal electrode arranged on the first side face of the capacitor body and a second terminal electrode arranged on the second side face of the capacitor body;
   a first inner electrode connected to the first terminal electrode and arranged within the capacitor body; and
   a second inner electrode connected to the second terminal electrode and arranged within the capacitor body;
   wherein the first inner electrode includes first and second main electrode portions arranged in a row along the opposing direction of the first and second end faces, and a first lead electrode portion extending from the first and second main electrode portions to the first side face and having an end exposed at the first side face and connected to the first terminal electrode;
   wherein the second inner electrode includes third and fourth main electrode portions arranged in a row along the opposing direction of the first and second end faces, and a second lead electrode portion extending from the third and fourth main electrode portions to the second side face and having an end exposed at the second side face and connected to the second terminal electrode;
   wherein first and second intermediate electrodes that are not connected to any of the plurality of terminal electrodes are arranged at least one each within the multilayer capacitor;
   wherein the at least one first intermediate electrode is arranged so as to form a first plurality of capacitance components connected in series in cooperation with the first and third main electrode portions;
   wherein the at least one second intermediate electrode is arranged so as to form a second plurality of capacitance components connected in series in cooperation with the second and fourth main electrode portions;
   wherein the first plurality of capacitance components formed by the at least one first intermediate electrode and first and third main electrode portions yield a first combined capacitance different from a second combined capacitance yielded by the second plurality of capacitance components formed by the at least one second intermediate electrode and second and fourth main electrode portions, the first plurality of capacitance components and the second plurality of capacitance components are connected in parallel with each other;
   wherein an end of the first main electrode portion on the first end face side and an end of the first lead electrode portion on the first end face side coincide with each other at a boundary between the first main electrode portion and first lead electrode portion;
   wherein an end of the second main electrode portion on the second end face side and an end of the first lead electrode portion on the second end face side coincide with each other at a boundary between the second main electrode portion and first lead electrode portion;
   wherein an end of the third main electrode portion on the first end face side and an end of the second lead electrode portion on the first end face side coincide with each other at a boundary between the third main electrode portion and second lead electrode portion; and
   wherein an end of the fourth main electrode portion on the second end face side and an end of the second lead electrode portion on the second end face side coincide with each other at a boundary between the fourth main electrode portion and second lead electrode portion.

2. A multilayer capacitor according to claim 1, wherein the first and second intermediate electrodes are provided one by one;
   wherein the first intermediate electrode includes a first region opposing the first main electrode portion along the opposing direction of the first and second main faces on the first side face side and a second region opposing the third main electrode portion along the opposing direction of the first and second main faces on the second side face side;
   wherein the second intermediate electrode includes a third region opposing the second main electrode portion along the opposing direction of the first and second main faces on the first side face side and a fourth region opposing the fourth main electrode portion along the opposing direction of the first and second main faces on the second side face side; and wherein the first and second regions have a total area whose size is different from that of the third and fourth regions.

3. A multilayer capacitor according to claim 1, wherein second intermediate electrodes are provided by a plural number different from that of the first intermediate electrode;
- wherein the second intermediate electrode positioned closest to the first side face in the plurality of second intermediate electrodes has a region opposing the second main electrode portion;
- wherein the second intermediate electrode positioned closest to the second side face in the plurality of second intermediate electrodes has a region opposing the fourth main electrode portion; and
- wherein each of the second intermediate electrodes has a region opposing another of the second intermediate electrodes.

4. A multilayer capacitor comprising:
- a capacitor body having rectangular first and second main faces opposing each other, first and second end faces extending in a shorter side direction of the first and second main faces so as to connect the first and second main faces to each other, and first and second side faces extending in a longer side direction of the first and second main faces so as to connect the first and second main faces to each other, the capacitor body exhibiting a dielectric characteristic;
- a plurality of terminal electrodes arranged on the capacitor body, the plurality of terminal electrodes including a first terminal electrode arranged on the first side face of the capacitor body and a second terminal electrode arranged on the second side face of the capacitor body;
- a first inner electrode connected to the first terminal electrode and arranged within the capacitor body; and
- second and third inner electrodes connected to the second terminal electrode and arranged within the capacitor body;
- wherein the first inner electrode includes first and second main electrode portions arranged in a row along the opposing direction of the first and second end faces, and a first lead electrode portion extending from the first and second main electrode portions to the first side face and having an end exposed at the first side face and connected to the first terminal electrode;
- wherein the second inner electrode includes a third main electrode portion, and a second lead electrode portion extending from the third main electrode portion to the second side face and having an end exposed at the second side face and connected to the second terminal electrode;
- wherein the third inner electrode includes a fourth main electrode portion opposing the first main electrode portion along the opposing direction of the first and second main faces so as to form one capacitance component, and a third lead electrode portion extending from the fourth main electrode portion to the second side face and having an end exposed at the second side face and connected to the second terminal electrode;
- wherein at least one intermediate electrode that is not connected to any of the plurality of terminal electrodes is arranged within the capacitor body;
- wherein the at least one intermediate electrode is arranged so as to form a plurality of capacitance components connected in series in cooperation with the second and third main electrode portions;
- wherein a capacitance of the one capacitance component formed by the first and fourth main electrode portions differs from a combined capacitance of the plurality of capacitance components formed by the at least one intermediate electrode and second and third main electrode portions, the one capacitance component and the plurality of capacitance components are connected in parallel with each other;
- wherein an end of the first main electrode portion on the first end face side and an end of the first lead electrode portion on the first end face side coincide with each other at a boundary between the first main electrode portion and first lead electrode portion; and
- wherein an end of the second main electrode portion on the second end face side and an end of the first lead electrode portion on the second end face side coincide with each other at a boundary between the second main electrode portion and first lead electrode portion.

5. A multilayer capacitor according to claim 4, wherein, in the opposing direction of the first and second end faces, each of the second and third lead electrode portions has a length identical to that of the first lead electrode portion.

6. A multilayer capacitor according to claim 4, wherein intermediate electrodes are provided by a plural number;
- wherein the intermediate electrode positioned closest to the first side face in the plurality of intermediate electrodes has a region opposing the second main electrode portion;
- wherein the intermediate electrode positioned closest to the second side face in the plurality of intermediate electrodes has a region opposing the fourth main electrode portion; and
- wherein each of the intermediate electrodes has a region opposing another of the intermediate electrodes.

* * * * *